United States Patent [19]

Anthony, Jr. et al.

[11] Patent Number: 4,765,941
[45] Date of Patent: Aug. 23, 1988

[54] THICKNESS CONTROL SYSTEM FOR AN EXTRUSION COATING APPARATUS

[75] Inventors: John D. Anthony, Jr., Wilmington, Del.; Kenneth W. Leffew, Kennett Square, Pa.; Joseph D. Trentacosta, Wilmington, Del.

[73] Assignee: E. I. Du Pont de Nemours and Company, Wilmington, Del.

[21] Appl. No.: 31,170

[22] Filed: Mar. 26, 1987

Related U.S. Application Data

[63] Continuation of Ser. No. 646,175, Aug. 30, 1984, abandoned.

[51] Int. Cl.$^4$ ............................................. B29C 47/92
[52] U.S. Cl. ................................. 264/40.1; 264/40.6; 264/40.7; 425/141; 425/144; 425/160; 425/172
[58] Field of Search ............... 264/40.1, 40.5, 40.6, 264/40.7, 327; 425/141, 143, 144, 160, 172

[56] References Cited

U.S. PATENT DOCUMENTS

| | | | |
|---|---|---|---|
| 2,938,231 | 5/1960 | Lowey, Jr. | 425/466 |
| 3,413,192 | 11/1968 | Beecher | 162/2.59 |
| 3,510,374 | 5/1970 | Walker | 156/64 |
| 3,552,203 | 1/1971 | Freeh | 73/159 |
| 3,767,900 | 10/1973 | Chao et al. | 235/151.1 |
| 3,883,279 | 5/1975 | Heyer | 425/141 |
| 3,940,221 | 2/1976 | Nissel | 425/141 |
| 3,974,248 | 8/1976 | Atkinson | 264/40.2 |
| 4,281,980 | 8/1981 | Hoagland et al. | 425/461 |
| 4,409,160 | 10/1983 | Kogo et al. | 264/40.1 |
| 4,439,125 | 3/1984 | Dieckmann et al. | 425/140 |
| 4,454,084 | 6/1984 | Smith et al. | 425/144 |
| 4,512,943 | 4/1985 | Hahn et al. | 425/144 |
| 4,514,348 | 4/1985 | Iguchi et al. | 425/141 |
| 4,517,145 | 5/1985 | Knopf | 425/141 |

FOREIGN PATENT DOCUMENTS

2542331 9/1976 Fed. Rep. of Germany ...... 425/141

Primary Examiner—Jeffery Thurlow

[57] ABSTRACT

A thickness control system for controlling the thickness of an extrudate includes a nested temperature control loop for controlling the temperature of a heat responsive element based upon a predetermined temperature set point. The temperature set point for the temperature control loop is computed based upon the measured thickness of the extrudate.

17 Claims, 14 Drawing Sheets

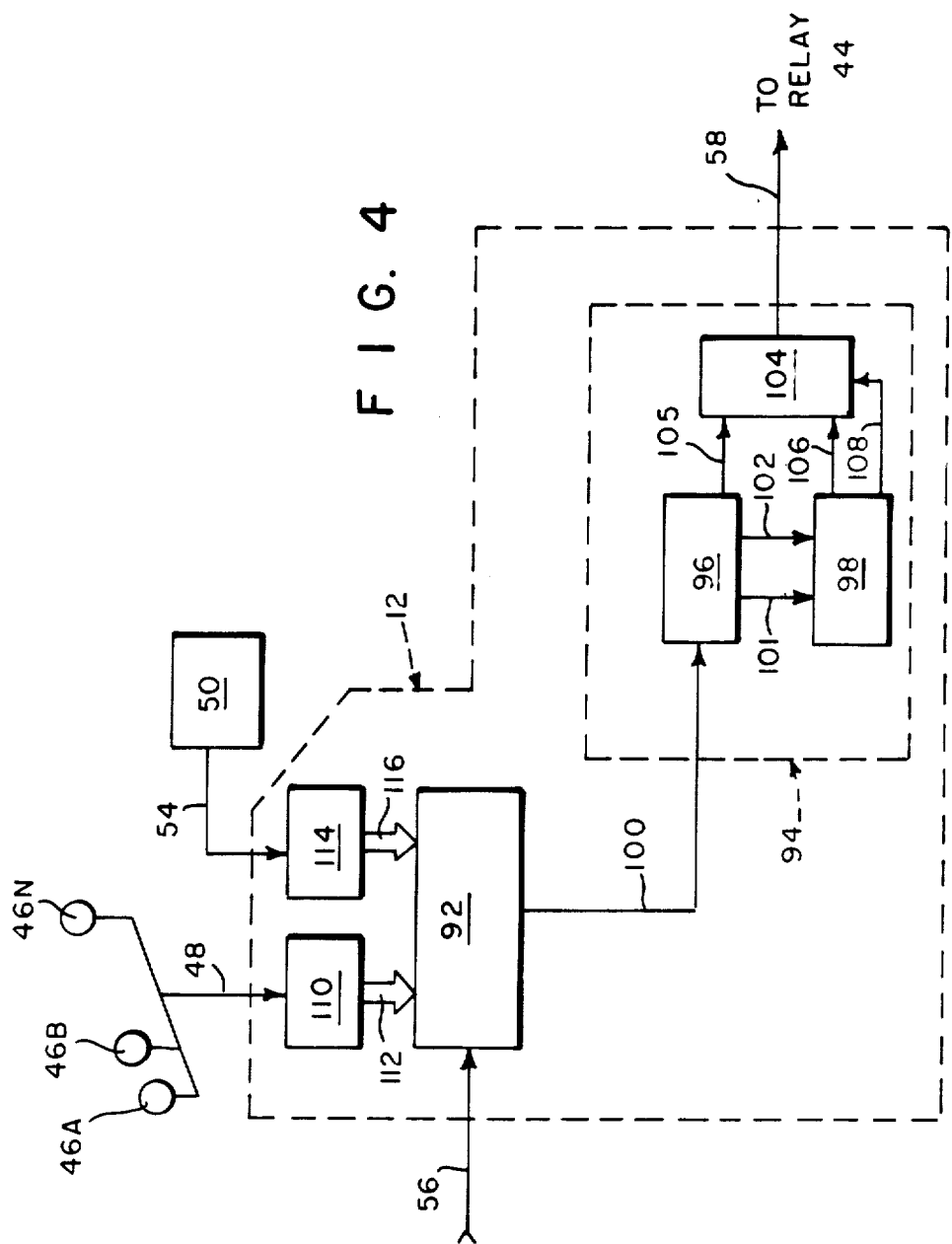

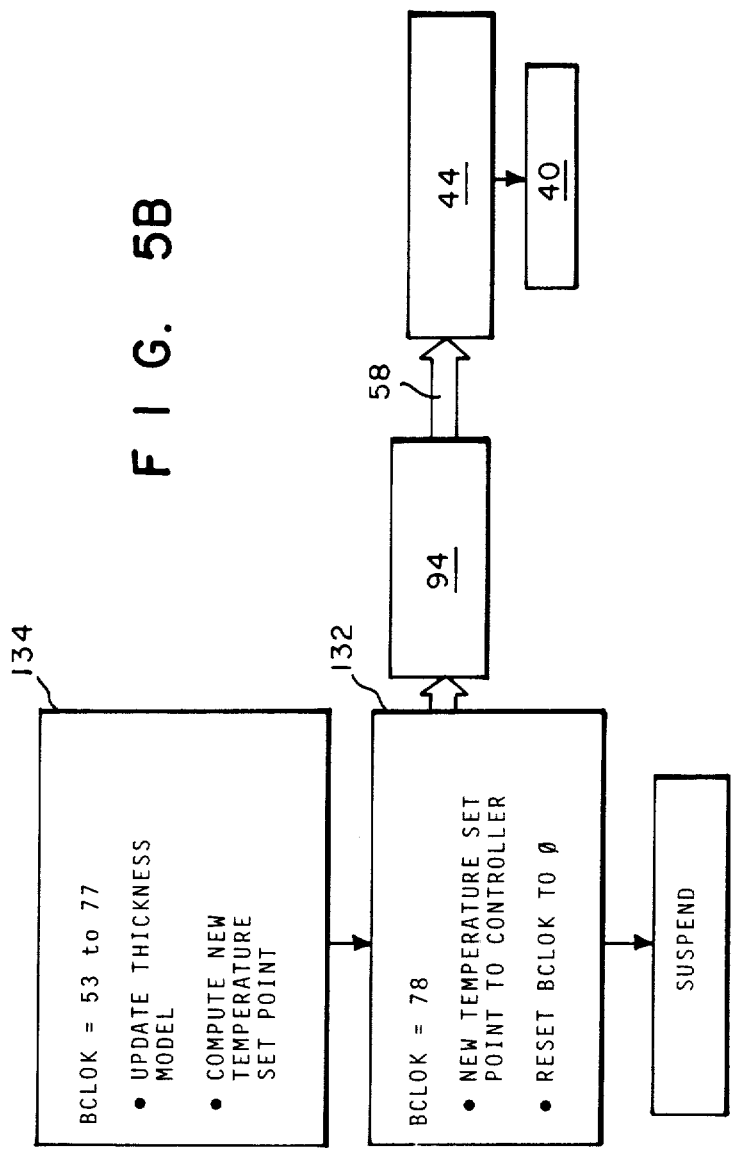

(Continued - to Fig. 6B)

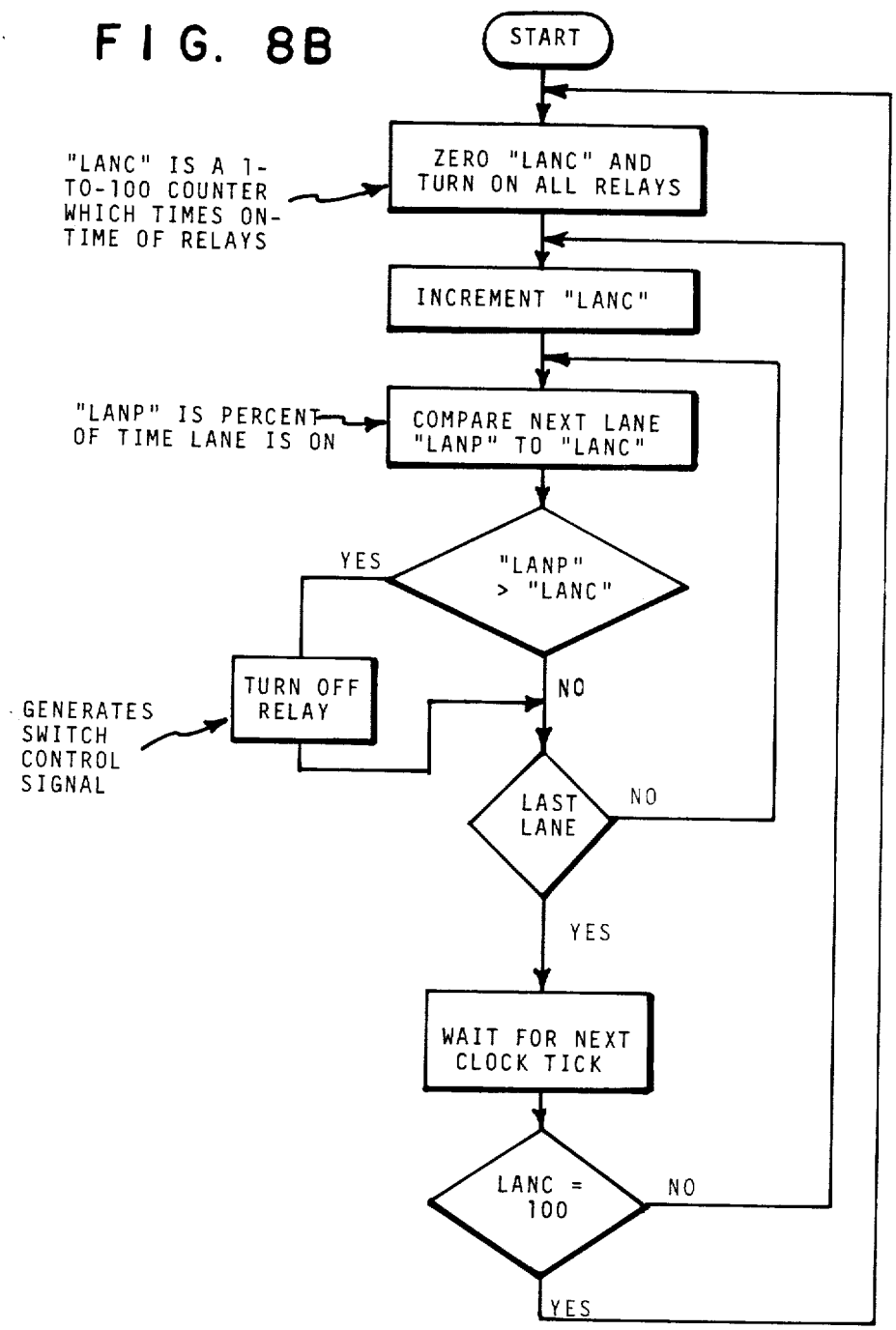

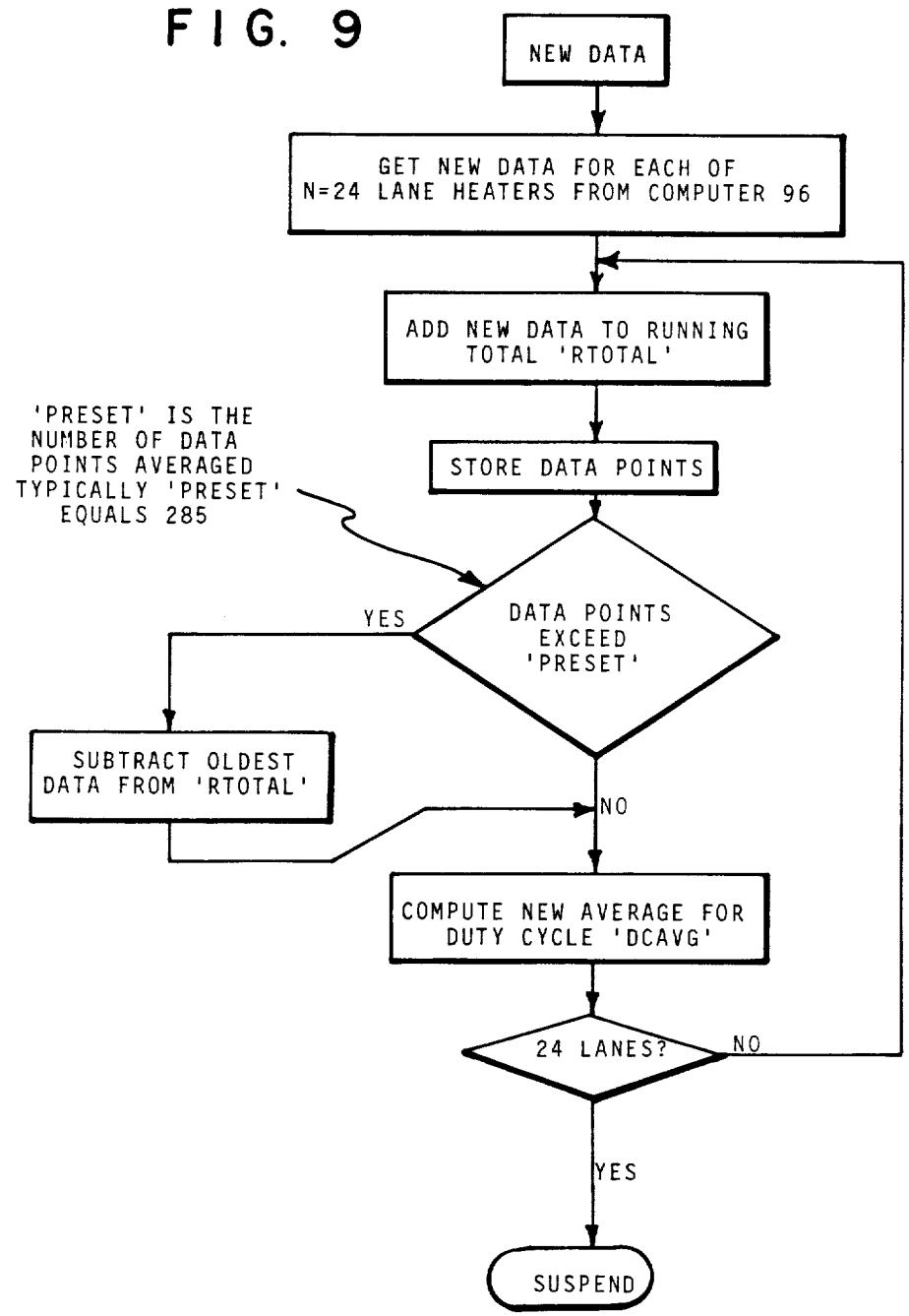

THICKNESS CONTROL SYSTEM FOR AN EXTRUSION COATING APPARATUS

This application is a continuation, of application Ser. No. 646,175 filed Aug. 30, 1984, abandoned.

FIELD OF THE INVENTION

This invention relates to a control system for an extrusion coating apparatus using a heat responsive element to modulate the coating die slot dimension and, in particular, to a control system wherein the thickness of the extrudate is used as the basis to generate a temperature set point for the heat responsive element.

DESCRIPTION OF THE PRIOR ART

An extrusion coating apparatus is a device wherein a composition is forced under pressure through an opening, or slot, defined between a confronting pair of relatively massive members called dies. One die includes a relatively flexible flange, or lip, which extends transversely of the die while the other of the dies carries a fixed lip also extending transversely of the die. The slot dimension is defined by the perpendicular distance between corresponding points on the lips of the confronting dies and it is this slot dimension which determines the thickness of the extrudate emanating from the apparatus.

In practice the extrudate may be deposited onto a suitable substrate or may form a film which is carried by a suitable conveyor arrangement. The thickness of the extrudate, whether deposited on a substrate or extruded in film form, is monitored downstream of the dies by a suitable gauge. Depending upon the measured thickness the slot dimension is appropriately modified.

One well known device for controlling the slot dimension involves the use of a plurality of heat responsive expansion bolts arrayed in spaced apart relationship across the transverse dimension of one die. Typical of such expansion bolts are those manufactured and sold by Thermac Corp. Each bolt operates against a localized portion of the flexible lip of the die on which the bolt is mounted. Dependent upon the duration of the excitation signal applied thereto the heat responsive bolt either expands or contracts from its previous condition to thereby respectively close or open the dimension of the slot in the vicinity of the bolt. Each bolt, therefore, is operative to modify the slot dimension in one of a corresponding plurality of contiguous lanes extending transversely across the width of the die.

The duration of the excitation signal applied to each bolt is functionally related to the thickness of the extrudate emanating from the die in the section of the film affected by that bolt as monitored by the thickness gauge. However, commercially available equipment such as defined above uses minimum sample control intervals on the order of two minutes. This results in a characteristic response time of approximately sixty minutes. The duration of these sample intervals and response times is believed to be unable to provide the degree of thickness control necessary for more critical and precise extruding operations.

The present thickness control scheme has other perceived disadvantages. One relates to the inability to control the thickness of the extrudate deposited in the lanes contiguous to the lateral boundaries of the die. Extruding near these boundaries results in a phenomenon known as "neck-in" in which the extrudate bends inwardly, i.e., away from the edges, and occasions a relatively thicker bead of extrudate forming in these regions. Another perceived disadvantage is the failure to accurately relate monitored thickness of the extrudate to the portion of the die (i.e., the lane) from which that extrudate emanated. Another disadvantage lies in the failure to provide a suitable system backup in the event of controller malfunction. Currently, a controller malfunction would result in the cessation of manipulation over the expansion bolts. Thus, over time after a malfunction, the die slot could achieve an arbitrary form which would lead to undesirable thickness nonuniformity across the web. As a corollary, when system control is restored the controller must readjust the dies to accommodate the deviations introduced during controller down time before thickness control may be reestablished.

In view of the foregoing it is believed advantageous to provide a control system in which increased sample frequency and decreased response times are available. Further, a system for reducing the effects of neck-in is also believed to be of advantage. Yet further, a system which accurately monitors and relates extrudate thickness to the portion of the die from which the extrudate emanated would be advantageous. Still further, a control system which provides a back up control scheme in the event of malfunction is also believed to provide an improvement over prior control systems.

SUMMARY OF THE INVENTION

The present invention relates to an extrusion coating apparatus of the type having a first and a second die, one of the dies having a flexible lip thereon while the other of the dies carries a rigid lip. The lips are spaced apart to define an elongated, transversely extending extrusion slot. An array of heat responsive elements is transversely spaced across the die having the flexible lip to provide localized slot control over each one of a plurality of transversely contiguous lanes. A thickness gauge is disposed downstream of the dies in a location where the thickness of the extrudate from each lane may be monitored. Preferably, a scanning-type gauge is used. Each heat responsive element includes, in the preferred case, a bolt having a heating element arranged in a heat transmissive association therewith.

In accordance with the present invention the thickness control system comprises a nested temperature control network for maintaining the temperature of the heat responsive element associated with a given lane within a predetermined range of a predetermined temperature set point. The temperature set point is generated in response to the monitored thickness of the extrudate. In the preferred embodiment the temperature control network includes a temperature sensing element, such as a thermocouple, physically disposed in a temperature monitoring relationship with the heat responsive element. The monitored temperature is used by the temperature control network to maintain the temperature of the heat responsive element at the predetermined temperature set point derived in accordance with the monitored thickness of the extrudate. Since the temperature control network responds faster to correct deviations from the predetermined temperature set point than the thickness control loop in which it is nested, more effective control of the slot dimension is afforded than is available in prior art systems which manipulate the slot dimension directly on the basis of monitored extrudate thickness. Also included is an arrangement which accurately correlates the monitored thickness of the extrudate with the portion of the die (i.e., the lane) from which that portion of the extrudate emanated so that the appropriate heat responsive elements are controlled to manipulate the appropriate portion of the slot.

The thickness control system also includes an arrangement which adjusts the temperature set point of the heat responsive elements lying within a predetermined range of contiguity to the lateral boundaries of the die based on the change in temperature set point of a selected one of the more laterally interior heat responsive elements. Such an arrangement serves to reduce the deleterious effects of extrudate neck-in.

The thickness control system further includes an arrangement which monitors the duration of the excitation signal (i.e., duty cycle) for each heat responsive element and maintains a running average thereof which is updated at predetermined intervals. In the event of system malfunction the current duty cycle signal for each element, based on the historical trend of temperature control for that element, is used as the control output until real-time control is restored.

Preferably the thickness control system is implemented by a distributed computer system. A host computer is used to calculate updated temperature set points based on monitored thickness measurements and the corresponding heater duty cycle time required to maintain the actual temperature at the set point. Each bolt has a dedicated software control loop executed by the host. The distributed control system also includes a primary and auxiliary microcomputer. The primary microcomputer serves to control the required duty cycle of the heaters for all the heat responsive elements. The auxiliary microcomputer tracks the duty cycle of the elements, generates the historical trend in the form of running averages and, in the event of host failure, supplies this information to the primary microcomputer to use for the heater control until host operability is restored.

BRIEF DESCRIPTION OF THE DRAWINGS

The invention will be more fully understood from the following detailed description thereof taken in connection with the accompanying drawings, which form a part of this application and in which:

FIG. 4 is a block diagram of the distributed computation arrangement used in the thickness control system of the present invention;

FIGS. 5A and 5B are a program timing and data flow diagram for the program used in a thickness control system of the present invention;

FIGS. 8A, 8B, 9 and 10 are, respectively, a flow diagram for the primary microcomputer program, a flow diagram for the program that generates a historical trend of previous heater duty cycle control signals, and a flow diagram for the auxiliary microcomputer heater control program.

DETAILED DESCRIPTION OF THE INVENTION

Figure 1:
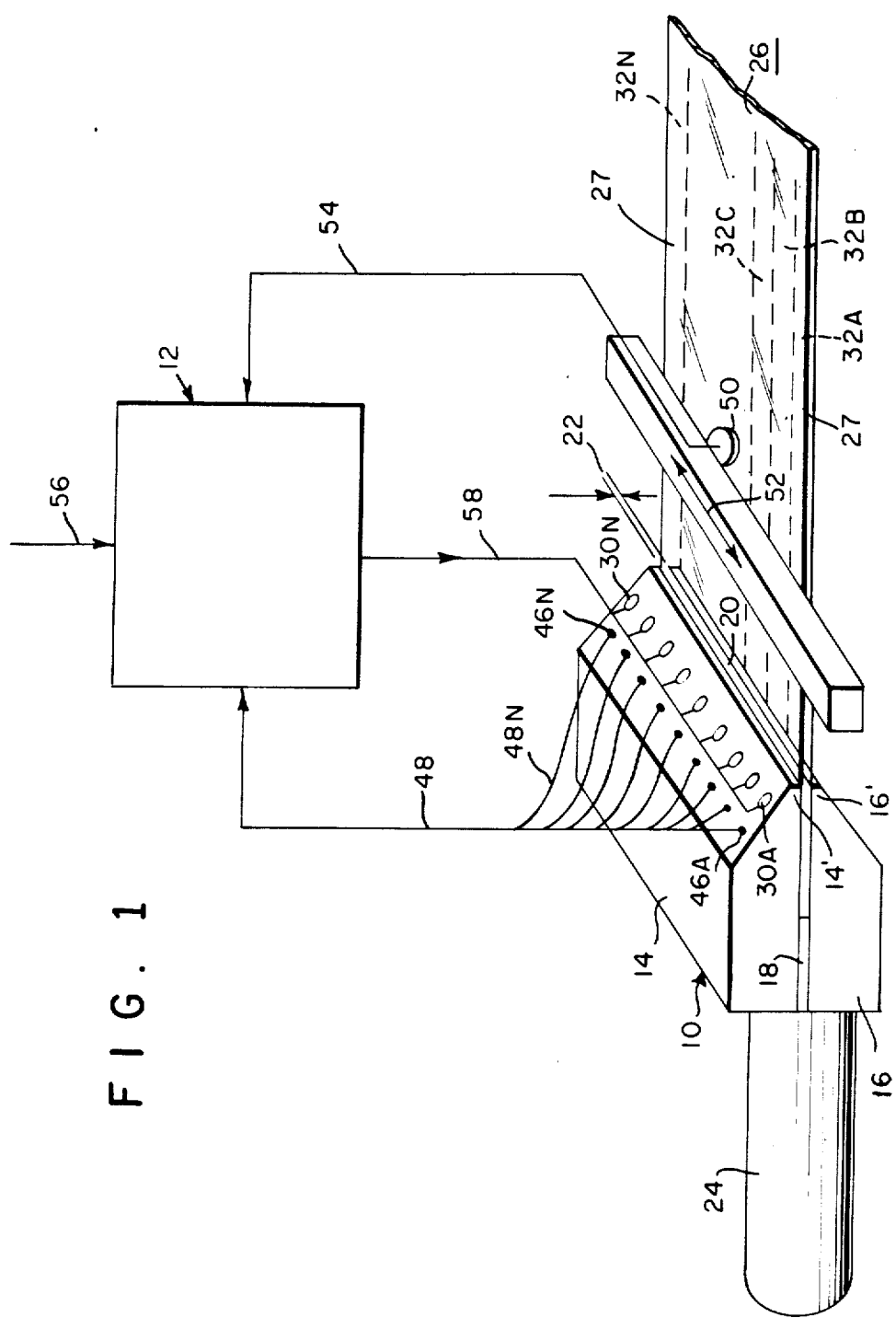
FIG. 1 is a stylized pictorial presentation of an extrusion coating apparatus with which a thickness control system in accordance with this invention may be used.

Throughout the following detailed description similar reference numerals refer to similar elements in all Figures of the drawings.

With reference to FIG. 1 shown is a generalized schematic representation of an extrusion coating apparatus generally indicated by reference character 10 with which a thickness control arrangement indicated by reference character 12 may be used. The coating apparatus 10 includes a body having an upper die member 14 and an opposing lower die member 16 separated by a shim 18 to define a transversely extending slot, or opening, 20 having a thickness, or width, dimension 22. The thickness dimension 22 is defined as the perpendicular distance between corresponding confronting points on the surfaces of the dies 14, 16. A composition to be extruded is introduced into the apparatus 10 from an extruder 24. A flat film sheet 26 of extrudate emanates from the spaced apart dies 14, 16. The film 26 may be beaded in the vicinity of its lateral edges 27 due to the effects of neck-in. The film 26 may be deposited on a suitable substrate or conveyer, both omitted from the Figure for clarity. It should be understood that the invention may also be used to control an annular extrusion die operative to produce a tubular film as long as suitable means are provided for locally adjusting the annular dimension of the slot. It should also be understood that the thickness control arrangement 12 is able to control the thickness of a single film extrudate or the total thickness of a multiplicity of films extrudate, including the control of overall thickness where a single or multiple film extrudate is extruded onto a substrate. Suitable dies are available, for example, from Extrusion Dies, Inc., Chippeiva Falls, Wis.

Figure 2:
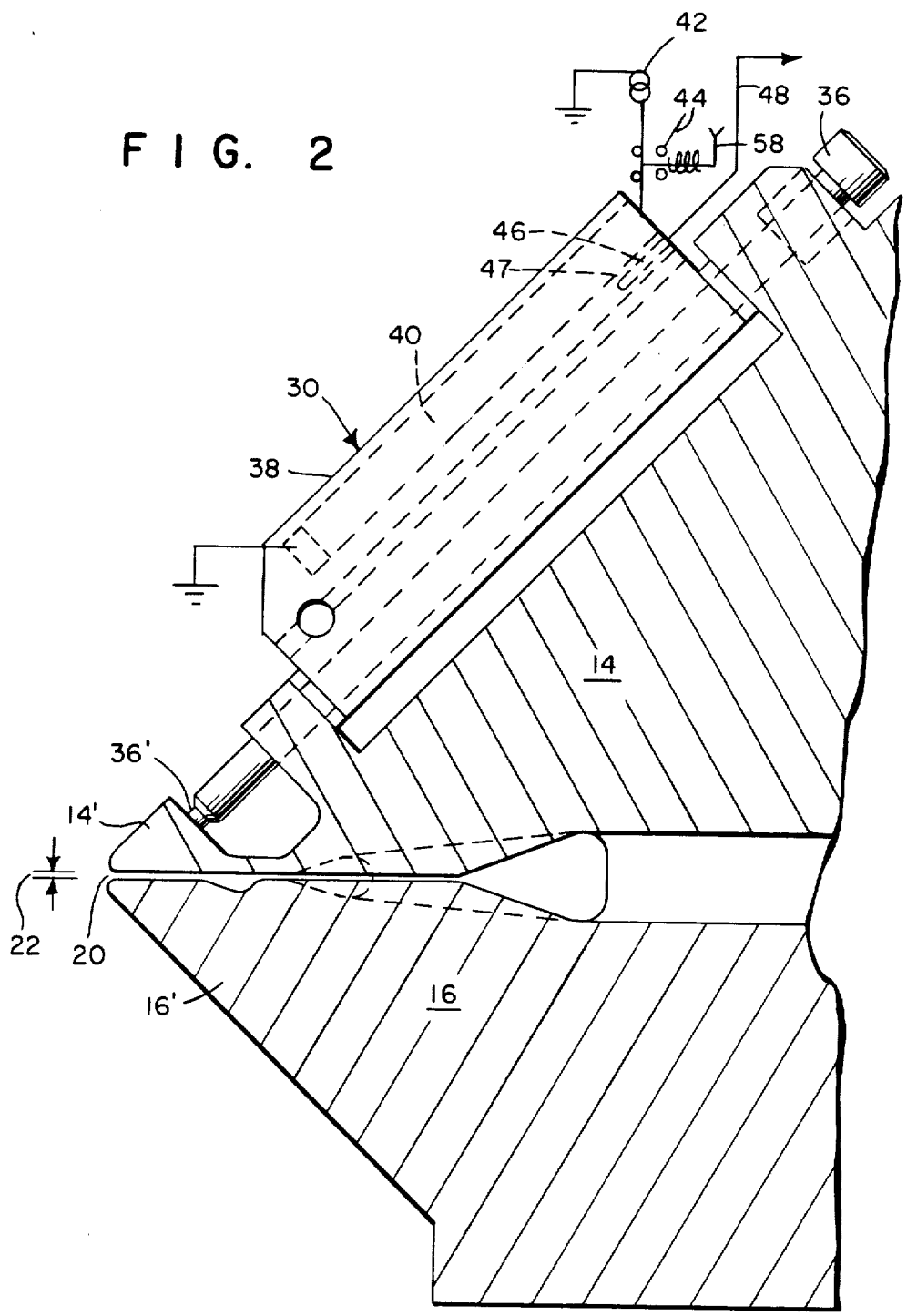
FIG. 2 is a detailed view of the physical mounting of a heat responsive expansion bolt and a temperature monitoring element associated therewith in accordance with the present invention.

As seen in FIG. 2, each die 14, 16 includes a forwardly extending lip 14', 16' respectively. One of the lips, e.g., the lip 14', is flexible and adjustable with respect to the other while the other of the lips 16' is rigid. Of course, the relative positions of the flexible and rigid lips may be reversed. Also, both of the lips could be flexible and controlled as discussed herein.

An array of heat responsive elements 30 is arranged longitudinally across the transverse dimension of the upper of the dies 14 having the flexible lip 14' thereon. Each element 30 is operatively associated with the adjustable lip 14' and is arranged, as set forth herein, to modulate the thickness dimension 22 of the portion of the slot 20 in the vicinity of the element. Consequently each element 30 may be viewed as controlling the thickness 22 of one of a plurality of N transversely contiguous lanes 32A through 32N arrayed across the transverse dimension of the film 26. It should be understood that any predetermined convenient number N of such lanes may be used. Throughout this application, the use of an alphabetic suffix for any element or function indicates that element or function which corresponds with the lane with which the suffix is associated.

Each of the heat responsive elements 30 is preferably a heat expansion bolt 36 mounted in a block 38 formed of a heat conductive material. The blocks 38 are received in any appropriate receptacle formed in the die 14. A cartridge electrical heater 40 is mounted in a heat transmissive relationship within a suitable recess formed in the block 38. The foot 36' of each of the bolts 36 is abutted against the flexible lip 14L of the die 14. The bolt 36 expands or contracts and thereby reduces or expands the thickness dimension 22 of the portion of the slot 20 in the vicinity thereof. The expansion or contraction of the bolt 36 is controlled by the temperature of the block 38 which temperature is, in turn, dependent upon the magnitude of the electric power applied thereto due to the flow of an electric current in a closed loop including the heater 40 and a source 42. A relay diagrammatically indicated at 44, preferably a solid state relay, controls the application of the current to the heater 40 under the control of the network 12 as discussed herein. Alternatively, the bolt 36 may be provided with an internal heater, if desired.

In accordance with this invention a temperature monitoring device, such as a thermocouple 46, is physically mounted in a temperature sensing relationship with the block 38 within a suitably located aperture 47 therewith. The aperture 47 may be located at any convenient position within the block 38. The aperture 47 may alternatively be formed as a hollow in the bolt 36 with the thermocouple sensor 46 disposed therein. The signal developed by each of the thermocouples 46 is separately conveyed by an associated line 48 to the control network 12. The thickness dimension 22 of the slot 20 in the vicinity of each heat responsive element 30 is, as may be appreciated, functionally related to the temperature of the block 38 and representative of the temperature of the bolt 36.

The bolts 36 are cooled in any convenient manner, as by flowing air thereover. Alternatively the bolts may be provided with threads or external fins to provide cooling surfaces.

Disposed a predetermined distance from the extrusion apparatus 10 is a thickness measurement gauge 50 arranged to scan transversely in the direction of the arrow 52 and to monitor the thickness of the film 26 in each of the transverse lanes 32A through 32N, respectively. The electrical signal representative of the monitored film thickness is applied via a line 54 to the control system 12. Suitable for use as the gauge 52 is a device sold by LFE Incorporated, Waltham, Mass., under model number 5001. The signals 54A through 54N representative of the thickness of the extrudate in the corresponding lane is derived by a scheme that, once knowing the transverse location of the film edge beads 27, apportions data from the thickness scan to each bolt lane in accordance with observed neck-in characteristics for that region of the die. An essential part of this process is the identification of the edge beads 27. The program which implements this function is set forth in full in the Appendix at pages A-37 to A-40.

Figure 3:
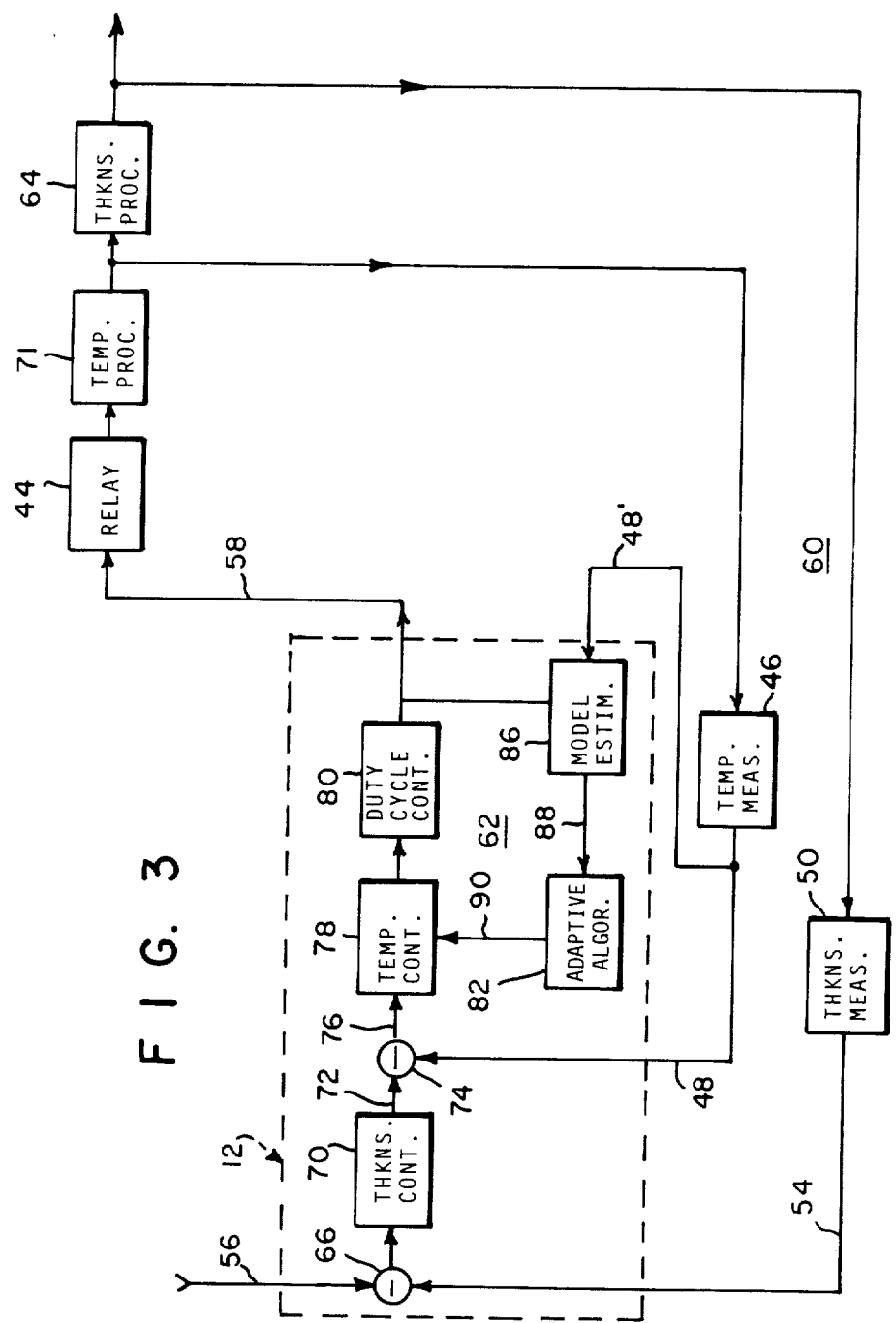
FIG. 3 is functional block diagram of the thickness control system in accordance with the present invention.

The thickness control system 12 in accordance with the present invention is shown in block diagram form in FIG. 3. The system 12 is operative to maintain the thickness of the extrudate within a predetermined range of the thickness reference as selected by an operator and applied to the system 12 as an appropriate reference signal on the line 56. The control system 12 is responsive to the signal representative of the temperature each of the heat responsive elements 30 as derived from the thermocouple 46 associated therewith and applied over the appropriate line 48 and to the signal representative of the thickness dimension 22 of the portion of the slot 20 in the lane corresponding to the element 30 as applied from the gauge 52 over the line 54. The control function is implemented by a control signal applied on a line 58 connected to the relay 44 corresponding to the element 30.

The control system 12 which controls the thickness of the extrudate in each of the lanes 32A through 32N includes, for each lane, an outer thickness control loop 60 and a nested, inner, temperature control loop 62.

A physical process, schematically indicated by the functional block 64, results in the creation of a extrudate having a thickness to be controlled. The physical process is implemented by the coating apparatus 10 described above. The thickness of the extrudate is measured by the gauge 50 and information representative thereof applied over the line 54 where it is subtracted at a junction 66 from the thickness set point signal selected by an operator and applied on the line 56. A thickness control algorithm represented by the functional block 70 (a program implementing the same being shown in flow diagram form in FIGS. 6A and 6B) generates on a line 72 a required change in the temperature set point (i.e., the temperature reference) to produce an updated temperature reference signal. This updated temperature reference signal is used to generate a reference for the inner temperature control loop 62. Thus, in accordance with this invention means are provided for converting the thickness measurement signal into a temperature reference signal.

Figure 7A:
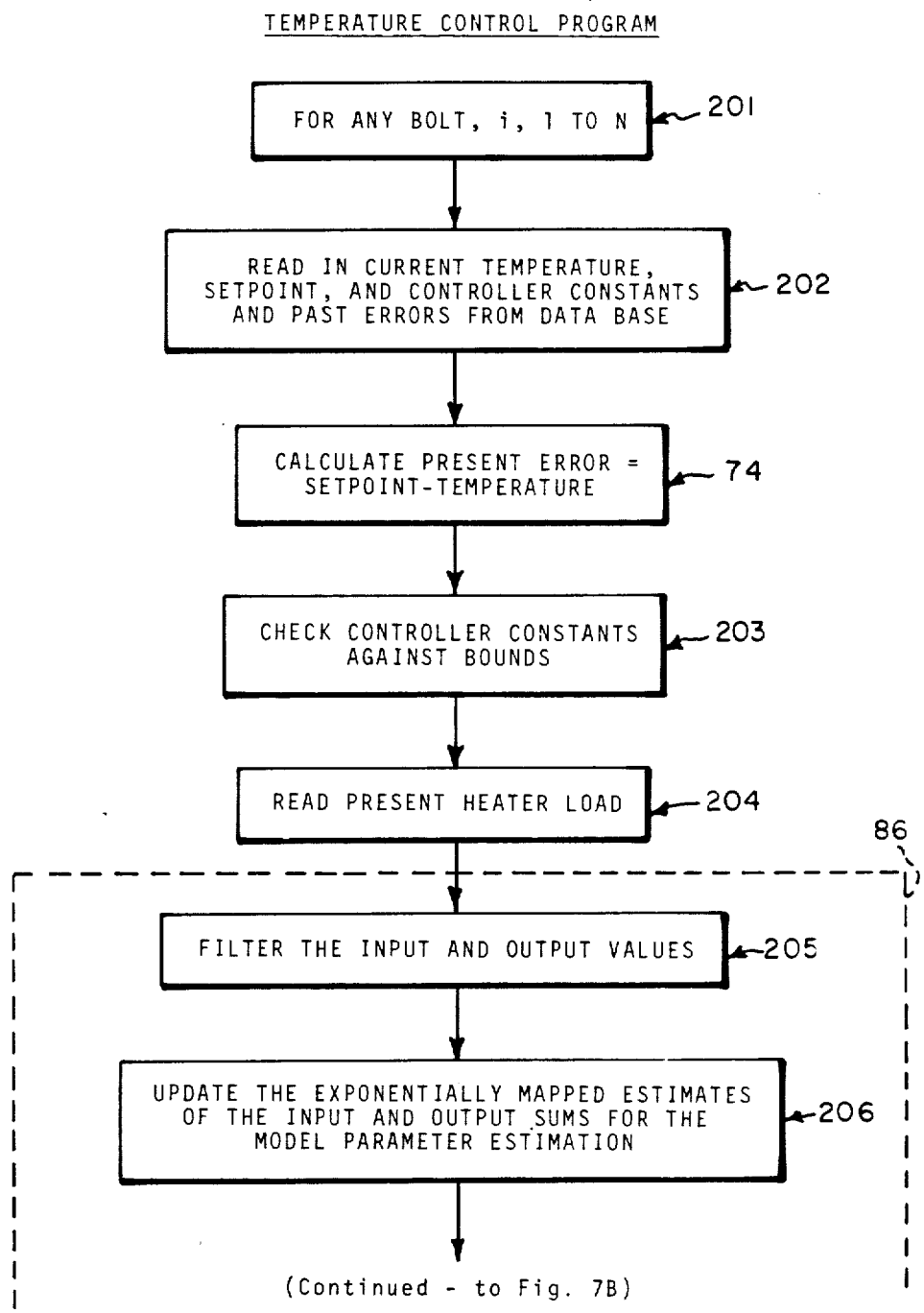

The physical process by which each heat responsive element 36 associated with each lane 32 is heated (e.g., by the passage of current) is indicated by the functional block 71. The temperature of each element 36 is monitored by its associated thermocouple 46 and is applied over the appropriate line 48 to a junction 74 where it is compared to the updated temperature reference. The information on the line 76 represents the difference, or error, of the temperature set point and the measured temperature and is applied to a temperature control algorithm indicated by the functional block 78. The temperature control algorithm is implemented by the program shown in flow diagram form in FIGS. 7A and 7B. The output of the temperatue control algorithm 78 is applied as a switch control signal output from a duty cycle controller indicated by the functional block 80 to the relay 44. The proportion of a predetermined time window (e.g., 1.666 seconds) that the switch control signal on the line 58 is in a selected state represents the duty cycle of a heater, i.e., the percentage of the predetermined time window in which the heater is asserted. That is, the percentage of the time that power is applied to the heaters during the predetermined time window. Any suitable heater time window duration may be used. The electrical heater is thus actuated in accordance with the difference or error to control the temperature of the bolt to cause the bolt temperature to reach the reference temperature.

The thickness measurement which serves as the basis of the temperature set point as described above is made at a predetermined thickness sample rate on the order of fifty seconds (although any suitable thickness sample rate may be used). However, temperature control is effected by the nested inner temperature control loop 62 at an increased temperature sample rate, on the order of seven seconds (although any other suitable rate may be used) thereby providing the system 12 with the ability to more quickly and efficiently bring the temperature of the element 36 to a desired level and maintain it at that level. It is in this manner that the thickness of the extruded film 26 is maintained at a predetermined uniform dimension.

Figure 7B:
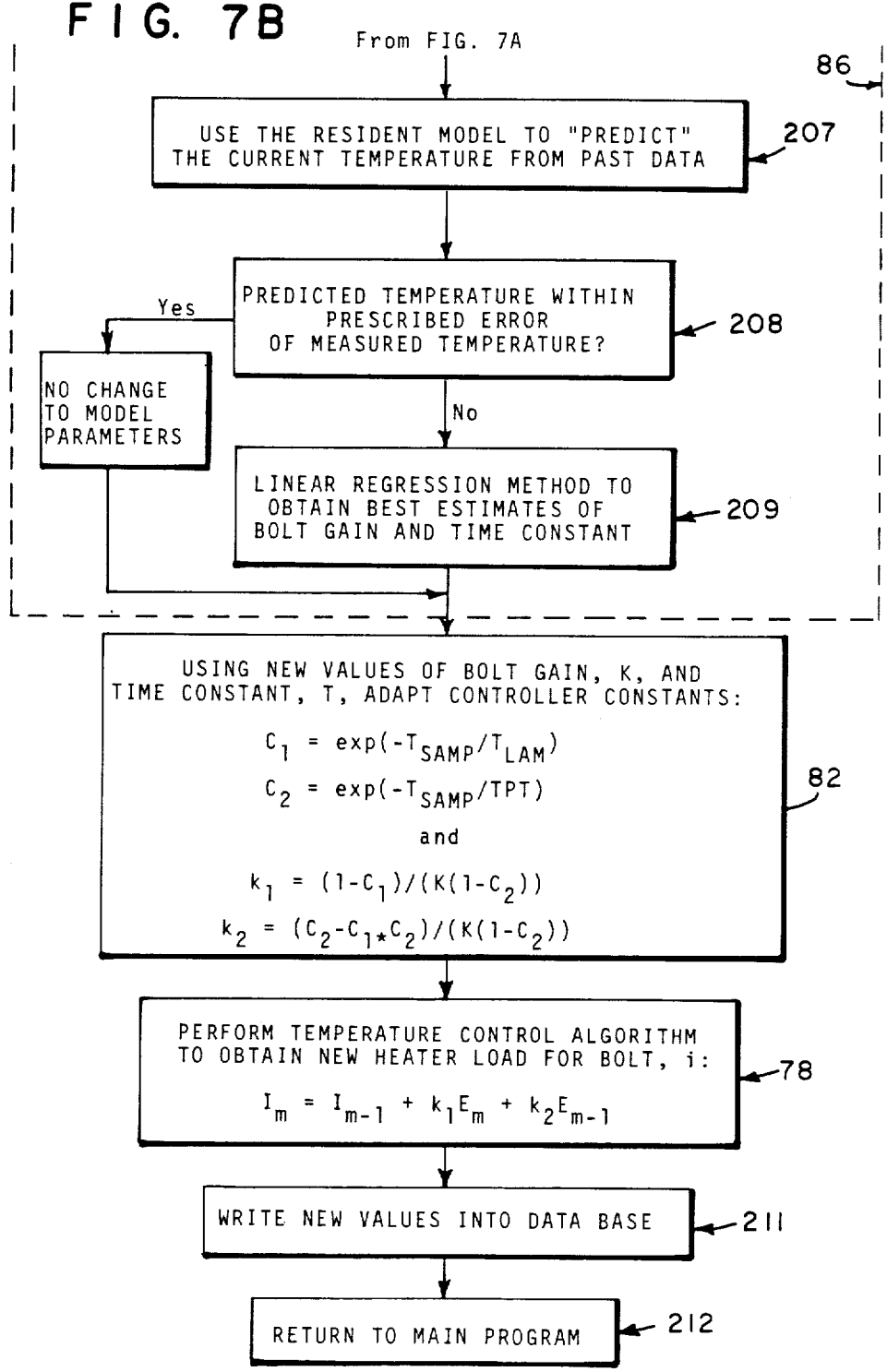

The inner temperatue control loop 62 includes a control parameter adapter algorithm indicated by the functional block 82 (implemented by the program disclosed in flow diagram disclosed in FIG. 7B) implemented in an on-line process identification technique. The actual temperature of a given bolt 36 is applied over a line 48' from the thermocouple 46 and is applied along with the duty cycle signal on the line 58 to a model parameter estimator indicated by the functional block 86. The estimated model parameters calculated in the functional block 86 are applied over the line 88 to the control parameter adapter algorithm represented by the functional block 82. The functional blocks 82 and 86 function, in combination, to provide an adaptive temperature control arrangement. As a result control parameters are output on the line 90 to the temperature control algorithm indicated by the functional block 78. A functional block 78 operates on the temperature error signal on the line 76 to adjust the analog signal applied to the duty cycle controller 80 and thereby to the relay associated with the bolt to adjust the duty cycle in a manner which acts to eliminate the temperature error associated with that bolt. Typically the operation of the inner loop 62 results in a duty cycle modification once every seven seconds. Of course any other predetermined rate may be selected. It is noted that because of the adaptive nature of the algorithm decoupling of the output of the thickness controller 70A through 70N is not needed.

As best seen in FIG. 4 the thickness control system 12 is physically implemented in the preferred embodiment using a distributed computer processing network comprising a host computer 92 connected with a microprocessor based relay controller 94. The controller 94 includes a primary microcomputer 96 and an auxiliary microcomputer 98. Suitable for use as the host 92 is a Hewlett-Packard HP-1000L minicomputer. The primary microcomputer 96 and the auxiliary microcomputer 98 are implemented using an Intel 8748 single chip microcomputer. Of course, any suitable components may be used to implement the network 12 and remain within the contemplation of the present invention.

The host 92 communicates with the controller 94 over a data link 100 connected directly to the primary microcomputer 96. The primary microcomputer 96 is connected to the auxiliary microcomputer 98 over a data link 101 and a control link 102. Each of the microcomputers 96, 98 is respectively connected to a data switch 104 via a data link 105 or 106. The switch 104 is asserted in accordance with the state of a data control line 108 to apply the switch control signal representative of a heater duty cycle on either the lines 105 or 106 to the solid state relay 44 associated with that heater. The state of the line 108 is determined by monitoring the data line 100 from the host 92 to the primary microcomputer 96. For example, if the primary microcomputer 96 is receiving data from the host 92 the switch 104 is closed by the signal on the line 108 to connect the lines 105 and 58. Otherwise the switch 104 is controlled to connect the lines 106 and 58 when data transmissions are not received by the primary microcomputer 96 from the host 92.

The host 92 interfaces with the thermocouples 46A through 46N through an interface 110 via a bus 112. The thickness gauge 50 is connected through a buffer 114 and a bus 116 to the host 92.

Figure 5A:
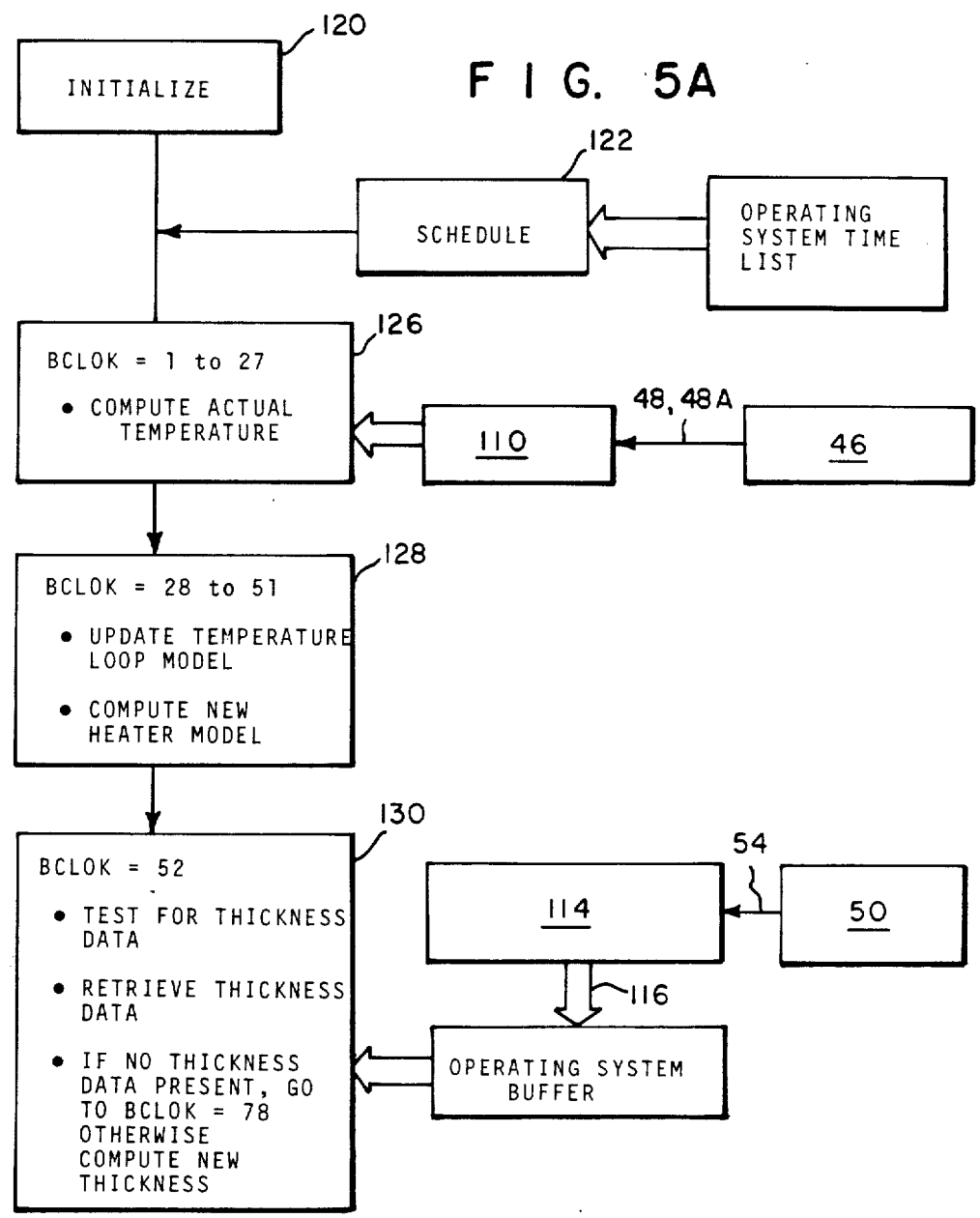

The operation of the thickness control system 12 in accordance with the present invention may be understood from the overall system timing and data flow diagram shown in FIGS. 5A and 5B. The discussion is set forth in terms of a twenty-four channel apparatus (N equal twenty four) and timing is defined in terms of clock intervals (BCLOK) defined by the master clock of the host 92.

After an initialization sequence as indicated by the computational block 120 the control program is initiated by an output from a schedule control computational block 122 under control of the operating system time list 124. During the first computational block 126 defined by the host clock intervals one to twenty-seven (BCLOK=1 to 27) the host 92 interrogates the outputs of the thermocouples 46 as applied through the interface buffer 110. The host uses this information of the monitored temperatures to derive the value of the corresponding actual temperatures of each of the expansion bolts 36.

The next program sequence indicated by the computational block 128 implements the temperature control function indicated schematically in the functional block 78 to derive an updated heater control signal. This computation is based upon the temperature set points prescribed as a result of the last-preceding thickness monitoring and the current value of the measured temperature control algorithm indicated by the functional block 78, using updated control parameters 90 derived from the adaptive algorithm represented by the functional block 82. The flow diagram of the temperature control program (including the adaptive algorithm 82) is set forth in FIGS. 7A and 7B.

During the computational block 130 defined by the host time interval corresponding to BCLOK=52 the host 92 checks the interface 114 to ascertain if an updating of the thickness measurement has occurred. If not, host computational activity is suspended until time interval corresponding to BCLOK=78 shown in the computational block 132. At this time (BCLOK=78) the updated heater control outputs computed during the computational block 128 are applied to the relay controller 94 which applies the updated heater duty cycle signal on the line 58 to the relay 44 of the particular bolt 36. The updating action of the temperature control loop 62 as described in connection with functional blocks 78, 80, 82 and 86 (FIG. 3) as implemented during computational blocks 126 and 128 (FIG. 5A) occurs at a repetition rate faster than the thickness computation rate to be described. Preferably the inner temperature control loop 62 is executed approximately once every seven seconds.

If the thickness monitoring has occurred when queried in the computational block 130 the host retrieves this information. The raw information, which contains data of all N lanes, is used to compute corresponding film thickness for all lanes.

The computational block 134 defined in host time interval corresponding to BCLOK=53 to 77 implements the thickness control depicted in the functional block 70 and computes a new temperature set point (the signal on the line 72) for each lane. The flow diagram of this program is set forth in FIGS. 6A and 6B. The new temperature set point derived as described is used during each succeeding temperature control loop (computational blocks 126 and 128) that occurs intermediate successive thickness monitorings. The thickness control loop 60 corresponding to the computational blocks 130 and 134 occurs once every fifty seconds in the preferred case.

Figure 6A:
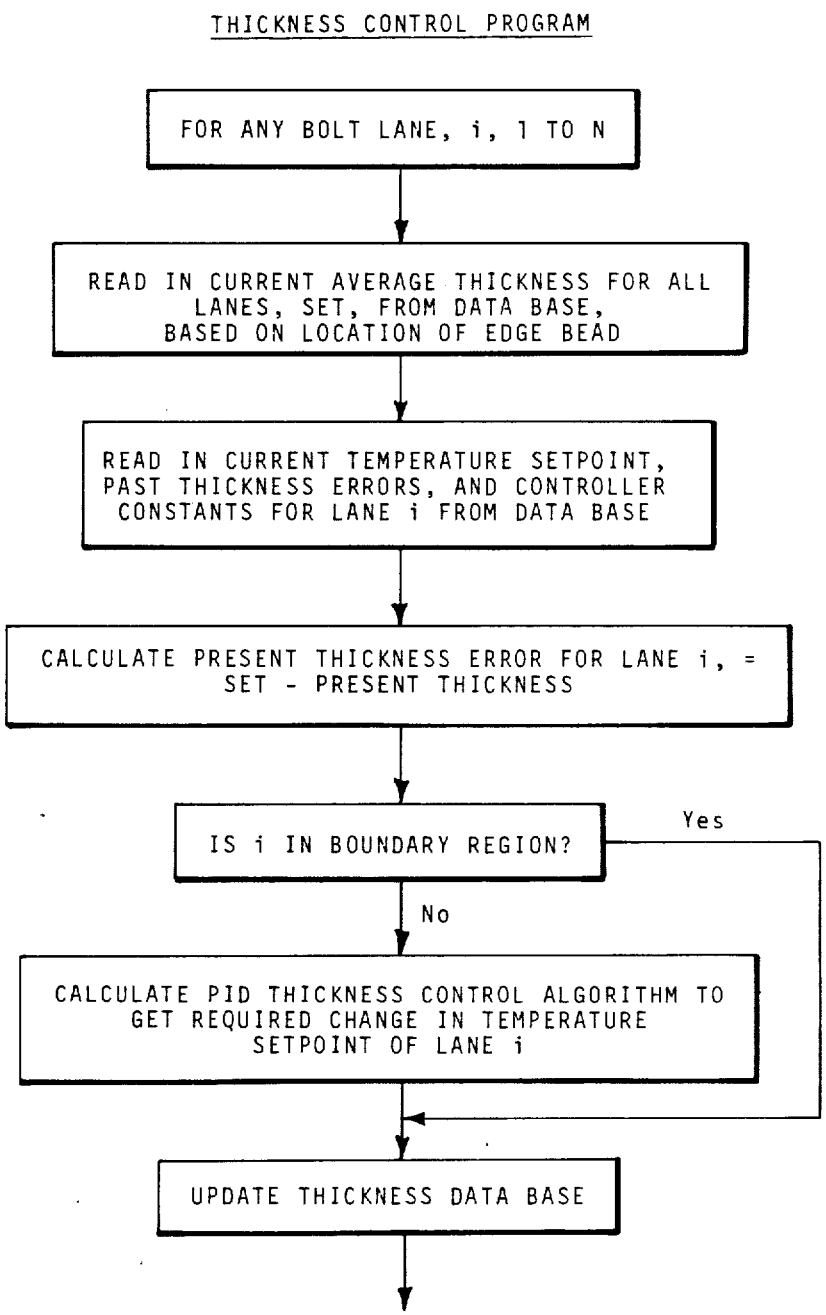
FIGS. 6A, 6B and 7A, 7B are respectively flow diagrams of the programs implementing thickness control algorithm and the temperature control algorithm (including the adaptive algorithm) used in the control system of the present invention.
Figure 6B:
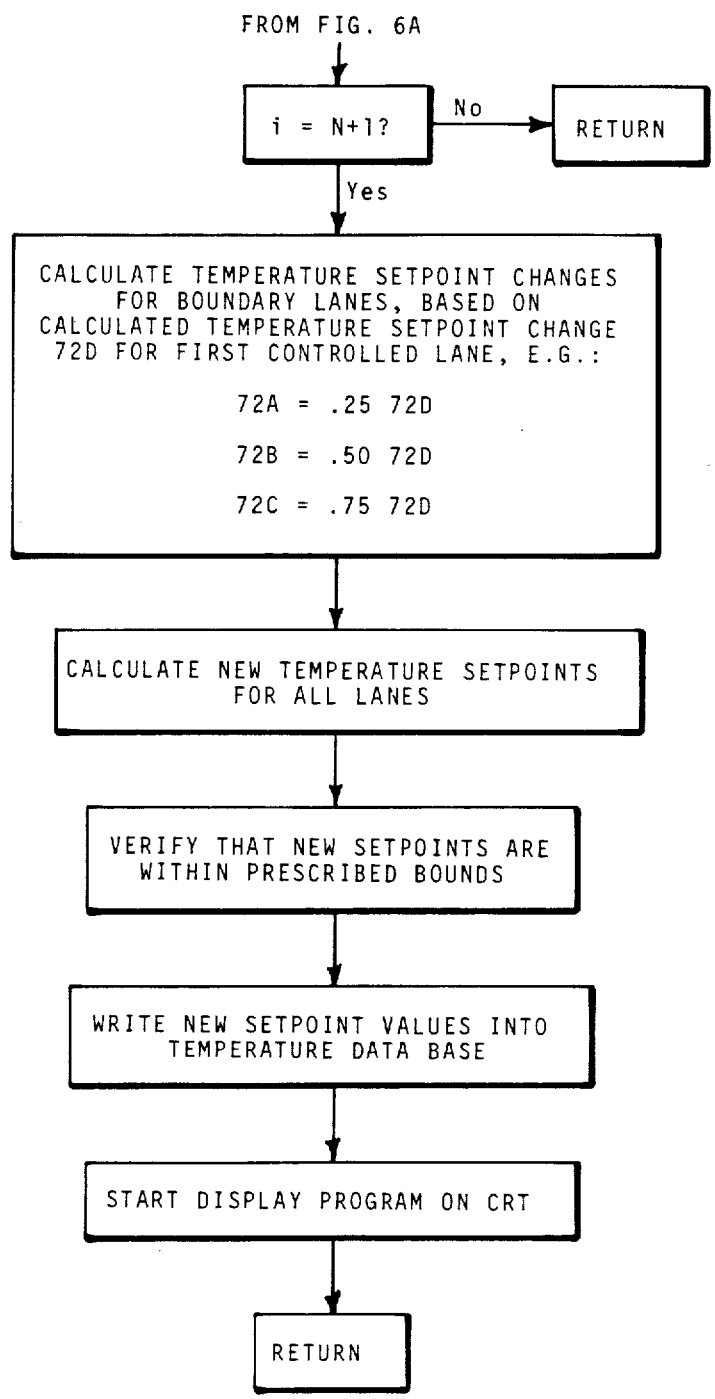

With particular reference to the thickness control program shown in FIGS. 6A and 6B as executed during the computational block 130 (FIG. 5A) to implement the functional block 78 (FIG. 3) it is noted that the updated heater set points for the heating elements within a predetermined range of contiguity of the lateral edges of the film 26 are determined based upon the thickness of the extrudate at a predetermined one of the inner lanes. For example, the temperature set points 72A, 72B, 72C respectively developed for the heat responsive elements associated with the lanes 32A, 32B and 32C may be based upon the thickness of the extrudate monitored for the lane 32D. Similarly, the temperature set points for the heaters associated with the lanes 32N, 32(N−1) and 32(N−2) are derived from the thickness of the extrudate monitored in the lane 32(N−3). As a result the control of the thickness of the extrudate in the lanes contiguous to the lateral edges of the film 26 is improved, thereby reducing the wastage present in the edge portions 27 of the film. It is noted that temperature control (once a temperature set point is derived) loop is the same for all heaters. But the temperature set point for the laterally outer lanes are derived from the thickness of the extrudate in a predetermined inner lane.

Figure 8A:
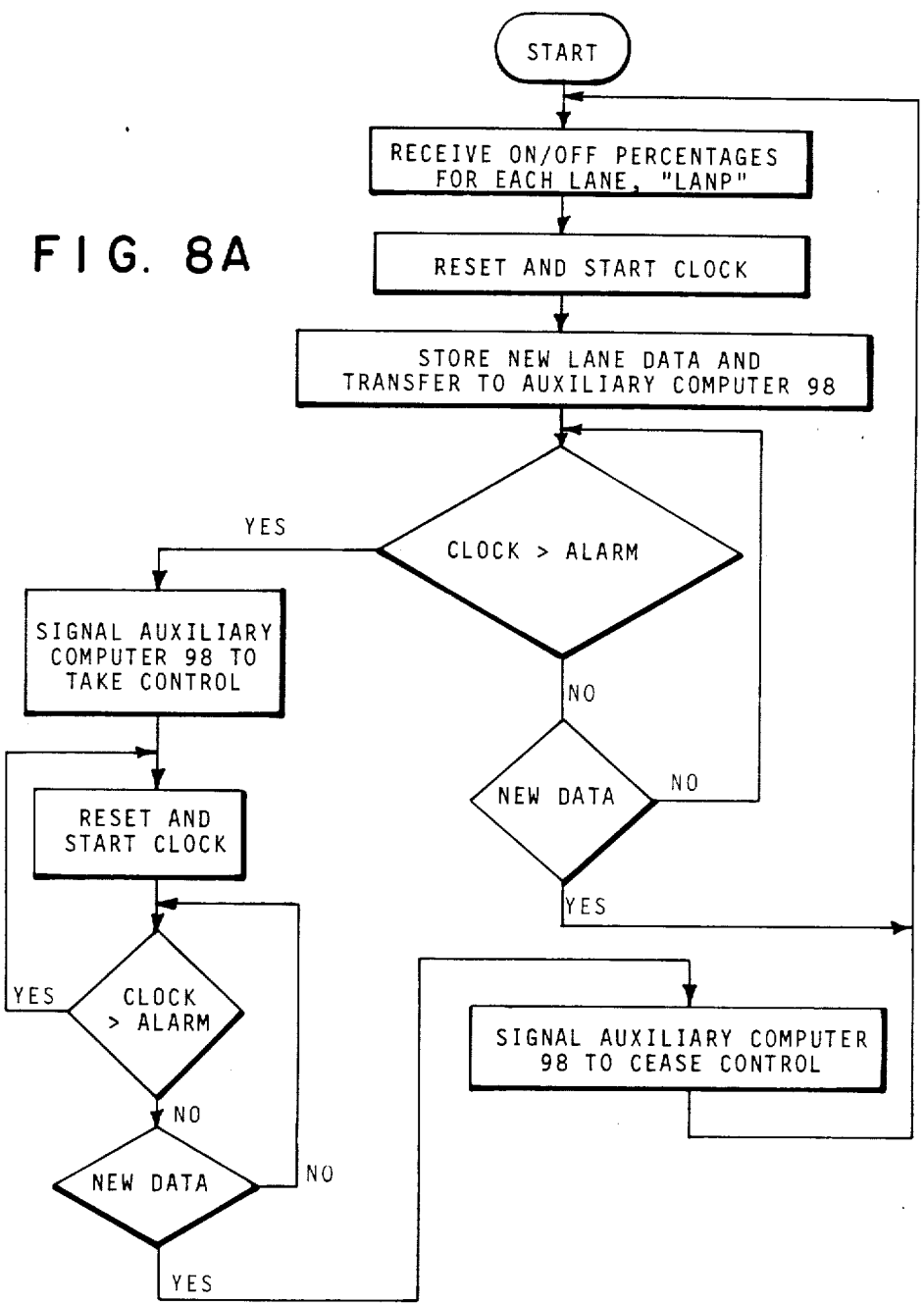

Once the appropriate heater duty cycle for each heat responsive element is applied to the controller 94 for that element the actual control of the heater is implemented by the primary microcomputer 96 over the line 105 connected through the switch 104. The microcomputer 96 controls each of the heaters 40 by regulating the duty cycle of the relays 44 which closes the circuit including that heating element for a predetermined duration of a predetermined time window. For example, a typical time window has a duration of 1.666 seconds. Using conventional power control circuitry this window affords one hundred opportunities at which current to the heater 40 may be interdicted. Thus, by controlling the point at which the power to the heater 40 is interrupted by opening of the relay 44, the duty cycle of the heater 40 is controlled. The primary microcomputer 96 also performs a "watch dog" function (shown in FIG. 8A) in that it monitors the data line 100 from the host 96 to verify that the host is transmitting data to the primary microcomputer 96. The heater control program executed by the primary microcomputer 100 is set forth in FIG. 8B.

In addition, the primary microcomputer 96 is associated with the auxiliary microcomputer 98. The auxiliary microcomputer 98 serves to generate and to store a continuously updated duty cycle control signal for each heater based upon a predetermined number of preceding duty cycle values. In the event of the loss of host control (as evidenced by the failure of the primary microcomputer 96 to receive data over the link 100) the switch 104 switches and a duty cycle set point based upon the stored historical trend of duty cycle values is applied over the line 106 from the auxiliary microcomputer 98 to the line 58 and this signal is used to control the heat responsive elements. Each time data is passed from the host computer 92 (every seven seconds) the data in turn is passed over the link 101 to the auxiliary computer 98. These data are averaged over a predetermined time, approximately two hundred eighty five samples which covers the period of about forty-five minutes for each lane. This time is arbitrarily selected to provide a reasonable history of the duty cycle trend. Before all of the predetermined number of samples are achieved the data is added and a new average is calculated. After the predetermined number of samples the newest data is added and the oldest data are removed from the total such that the results is the average of only the latest predetermined number of samples. The program for this function of the auxiliary microcomputer 98 is shown in FIG. 9.

Figure 10:
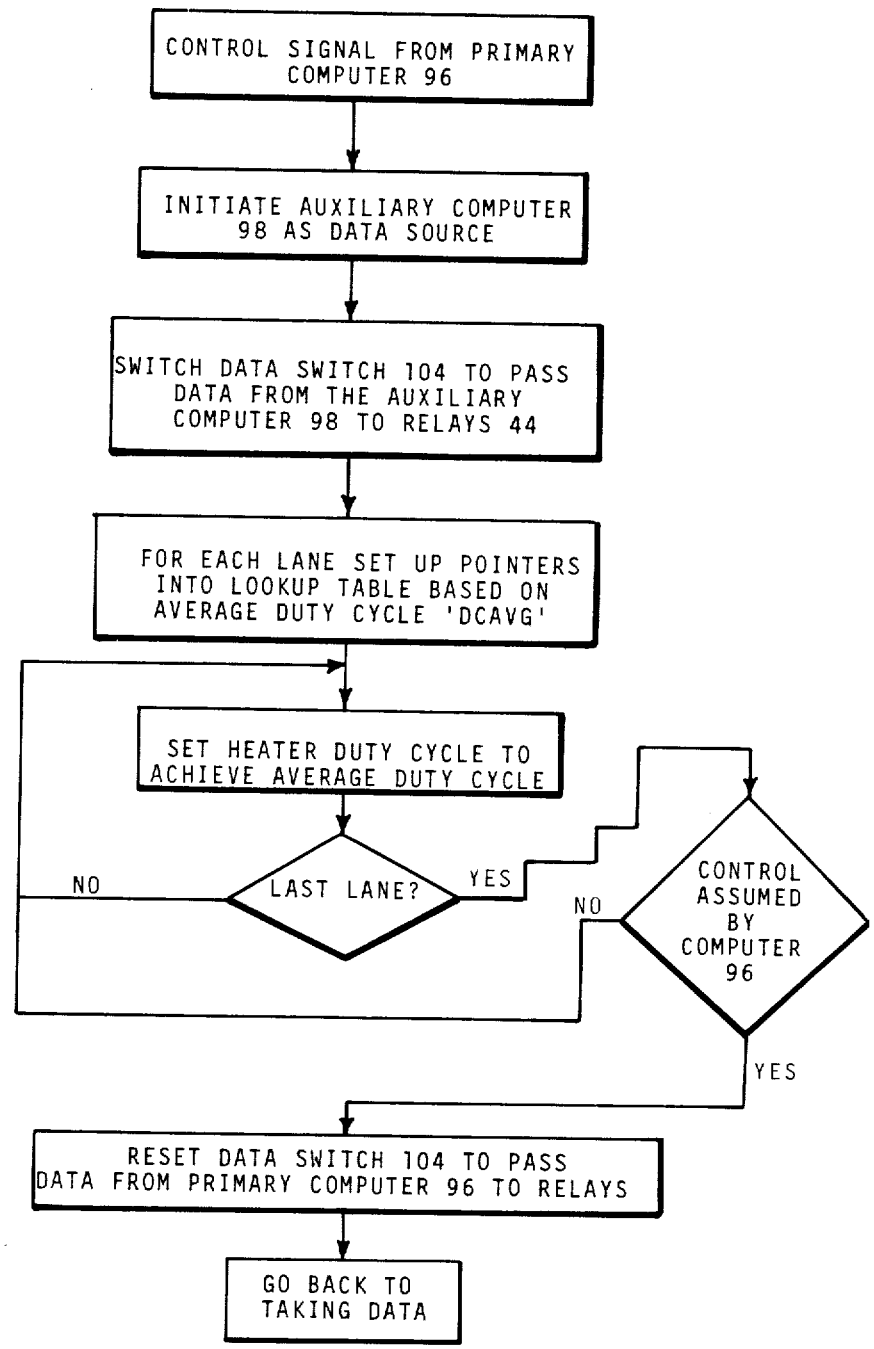

As seen from the program illustrated in flow diagram form in FIG. 10 at the time the primary microcomputer 96 determines by way of its "watch-dog" function that data are no longer being provided by the host computer 92 a control signal is passed over the line 102 to the auxiliary microcomputer 98 to take over the control function based on the previously computed and stored historical trend of the duty cycle. The auxiliary microcomputer executes a routine which permits the duty cycle of the heaters to approximate as closely as possible the historical duty cycle value. The limitation imposed by the existence of discrete switching points may render impractical a duty cycle value somewhere intermediate discrete points. So, the auxiliary microcomputer operates the heaters in such a manner that after a predetermined number of time windows has elapsed, the weighted sum of the duty cycles imposed during each window results in duty cycle much closer to the accumulated duty cycle value. As a result when the host operability is restored the correction to the duty cycle set point needed to compensate for the period of host inoperability is minimized. This function of the auxiliary microcomputer 98 is shown in FIG. 10.

Two periods of different lengths are used by the auxiliary microcomputer 98 to control the average temperature of the die bolts. The first period, referred to as division one, consists of one hundred cycles of the sixty cycle line frequency. The second, referred to as division two, consists of one hundred cycles of division one. Division one lasts 1.666 seconds and division two lasts for (100×1.666) or 2.78 minutes. This time is selected as a compromise between the ability to achieve good resolution, one part in ten thousand, an the thermal time constant of the die bolts which is approximately fifteen minutes. The percentage time of each division is determined as in the following example.

EXAMPLE

Duty cycle average to be duplicated—DCAVG=55.35%

Division 2—65%—35%.

Division 1 (ON/OFF)—55/45—56/44.

Further, if division two percentages were even (divisible by two), then they would be reduced to the next smallest fraction. For instance, if the percentage of time that the 55/45 ratio to be held was 64 instead of 65 then the percentages would be changed to 32% for the 55/45 ratio and 16% for the 56/44 ratio which would be an equivalent average time but has the advantage of less temperature "ripple".

At the time the auxiliary duty cycle control computer is signaled that it must provide the control, a table is set up for each lane based on the averages that must be maintained. Once the table has been established, address pointers into the table are used by the computer to determine the on-off control sequence for the solid state relay for each heater.

The Appendix, which forms a part of this specification, contains listings of the programs described in the FIGS. 6 and 7. The programs are set forth in the Fortran language and are keyed to the functional or computational blocks indicated in those Figures. The Appendix is sequentially paginated with a prefix "A" and includes pages A-1 through A-45. The Appendix appears immediately preceding the claims.

Those skilled in the art, having the benefit of the teachings of the present invention as set forth herein may effect numerous modifications thereto. Such modifications are to be construed as lying within the scope of the present invention as defined by the appended claims.

APPENDIX

```
                        LISTINGS
                    0001    :RP,LFE
                    0002    :RP,FILMC
                    0003    :RP,TSET
                    0004    :RP,PARDM

0001    FTN4,L
0002    C
0003
0004            PROGRAM LFE
0005    C
0006    C   **********************************************************
0007    C   *
0008    C   *   Program gets serial data from the LFE and transfers it
0009    C   *   to the main program using using class calls.  The class
0010    C   *   is obtained by the main program and passes it to this
0011    C   *   program when it initially schedules this program.
0012    C   *
0013    C   *   The data from the LFE is in the following format:
0014    C   *
0015    C   *       43B 4=xxx.xxx@@ @@ @@ ---------------@@4*
0016    C   *
0017    C   *   where xxx.xxx is ASCII representing the average
0018    C   *   thickness,@@ are two 7 bit data fields:
0019    C   *
0020    C   *   100aaaa 100bbbb where aaaabbbb are a 8 bit twos
0021    C   *   compliment number representing the + and - deviation
0022    C   *   from the average.
0023    C   *
0024    C   *   The data is transferred in floating point format
0025    C   *   with the first word representing the average and
0026    C   *   the remaining words (~96) representing the deviation
```

```
0027  C   *     from the average.
0028  C   *
0029  C   *
0030  C   ****************************************************************
0031  C
0032        INTEGER ICLAS,LU,IDUM1,IDUM2,IDUM3,IDUM4,ICNWD,LEN,IB,IA
0033        INTEGER IOP1,IOP2,PARM(5),BUFFER(300),CNWD,DATLEN,IBUF(300)
0034        INTEGER STBUF(300),INAM(3)
0035        INTEGER TEMP,TEMP1,IDATA,SIGN,IX,SCANFL
0036        REAL DATA(300),X,CALFAC,DIES
0037        EQUIVALENCE(DATA,IBUF)
0038        DATA INAM/2HDS,2HTO,2HR /
0039        ICNWD=26              !SERIAL CARD LU
0040
0041        ICTR=1
0042        CNWD=100B             !INDICATES BINARY DATA
0043        IOP1=0
0044        IOP2=0
0045        SCANFL=1
0046  C
0047  C   GET CLASS NUMBER (ICLAS) FROM CALLING PROGRAM
0048
0049  C
0050        CALL RMPAR(PARM)
0051        ICLAS=PARM(1)
0052  C
0053  C   GET DATA FROM LFE DEVICE THROUGH SERIAL CARD (LU 13)
0054  C
0055        WRITE(1,11)
0056    11  FORMAT("ENTER VALUE FOR DIES")
0057        READ(1,12)DIES
0058    12  FORMAT(F3.2)
0059        CALFAC=DIES/128
0060        WRITE(1,10)
0061  C
0062    10  FORMAT("ENTER NUMBER OF CHARACTERS TO CAPTURE")
0063        READ(1,20)LEN
0064        IF (LEN.LT.0) GOTO 400
0065    20  FORMAT(I3)
0066     5  LEN=-LEN
0067        CALL EXEC(1,ICNWD,BUFFER,LEN)
0068  C
0069        LEN=ABS(LEN)
0070        IF (SCANFL.EQ.0)THEN
0071          SCANFL=1
0072          GOTO 5
0073        ELSE
0074          SCANFL=0
0075        ENDIF
0076  C
0077  C   UNPACK DATA
0078  C
0079        DO 100 K=1,LEN
0080          TEMP=BUFFER(K)
0081          TEMP1=TEMP/256
0082          TEMP=IAND(TEMP,377B)
0083          I=2*K-1
0084          STBUF(I) =TEMP1
0085          STBUF(I+1)=TEMP
0086   100  CONTINUE
0087  C
0088  C   CONVERT DATA TO BINARY FORMAT
0089  C
0090  C   CONVERT ASCII AVERAGE TO REAL NUMBER
0091  C
0092  C   FIND DECIMAL POINT
```

```
0093  C
0094          KCTR=0
0095          DO 30 K=1,20
0096              KCTR=KCTR+1
0097              IF (STBUF(K).EQ.56B)THEN
0098                  ISP=KCTR-1                  !SET STARTING POINT
0099                  GOTO 31
0100              ELSE
0101                  IF(KCTR.EQ.20)THEN
0102                      WRITE(1,32)(STBUF(KK),KK=1,20)
0103      32          FORMAT("DATA OUT OF RANGE",20A2)
0104                      SCANFL=1
0105                      GOTO 5
0106                  ENDIF
0107              ENDIF
0108   30     CONTINUE
0109  C    NOW CONVERT
0110  C
0111   31     IX=STBUF(ISP)-60B
0112          X=FLOAT(IX)
0113          DATA(1)=X
0114          IF (DATA(1).LT.0) THEN
0115              DATA(1)=0
0116          ENDIF
0117          IX=STBUF(ISP+2)-60B
0118          X=FLOAT(IX)
0119          DATA(1)=X/10+DATA(1)
0120          IX=STBUF(ISP+3)-60B
0121          X=FLOAT(IX)
0122          DATA(1)=DATA(1)+X/100
0123          IX=STBUF(ISP+4)-60B
0124          X=FLOAT(IX)
0125          DATA(1)=DATA(1)+X/1000
0126  C
0127  C    TEST FOR OUT OF RANGE
0128  C
0129          IF(DATA(1).LE.0.OR.DATA(1).GT.10)THEN
0130              WRITE(1,33)DATA(1)
0131      33      FORMAT("LAST DATA FOR LFE WAS OUT OF LIMITS - AVG= ",F6.3)
0132              WRITE(1,35)(STBUF(KK),KK=1,10)
0133              WRITE(1,34)(BUFFER(KK),KK=1,5)
0134      34      FORMAT("BUFFER=",5A2)
0135      35      FORMAT("STBUF=",10A2)
0136              SCANFL=1
0137              GOTO 5
0138          ENDIF
0139  C
0140  C    ASSEMBLE PROFILE DATA FROM CODED FORMAT
0141  C
0142          I=2
0143          DO 500 K=ISP+6,LEN,2
0144              TEMP=STBUF(K)
0145              TEMP=TEMP*16                   !MOVE 4 BITS LEFT
0146              TEMP1=IAND(STBUF(K+1),17B)     !MASK NEXT WORD FOR RIGHT 4 BITS
0147              IDATA=IAND(TEMP+TEMP1,377B)    !ADD AND MASK OUT HI BYTE
0148              SIGN=IAND(IDATA,200B)          !TEST BIT 9 FOR SIGN
0149              IF (SIGN.NE.0) THEN
0150                  IDATA=IDATA+177400B        !IF LO BYTE (-) MAKE WORD (-)
0151              ENDIF
0152              DATA(I)=FLOAT(IDATA)
0153              DATA(I)=DATA(I)*CALFAC
0154              I=I+1
0155   500    CONTINUE
0156          DATLEN=(I-1)
0157  C    TRANSFER DATA TO MAIN PROGRAM
0158  C
0159  C
```

```
0160          DATLEN=DATLEN*2
0161          CALL EXEC(20,0,IBUF,DATLEN,IOP1,IOP2,ICLAS)
0162          ICTR=ICTR+1
0163          WRITE(1,333)ICTR,(STBUF(KK),KK=1,10)
0164          WRITE(1,334)ICTR,(BUFFER(KK),KK=1,5)
0165   333    FORMAT("LFE TRANSFER ",I5,2X,10A2)
0166   334    FORMAT("LFE TRANSFER ",I5,2X,5A2)
0167   C
0168   C   CALL PROGRAM TO STORE DATA
0169   C
0170          CALL EXEC(10,INAM,IDUM1,IDUM2,IDUM3,IDUM4,IDUM5,IBUF,DATLEN)
0171          GOTO 5
0172      400 END
LODA

0001   SN,SNAP::-16
0002   LCOM
0003   SCOM
0004   LIB,$F4XLB
0005   LIB,$HPIB
0006   OUTPUT,FILMC::-17
0007   -SZ,25
0008   REL,%FILMC
0009   REL,%TSCN1
0010   REL,%TSCN2
0011   REL,%TSCN3
0012   REL,%TSCN4
0013   REL,%TSCN5
0014   REL,%BOLTP
0015   REL,%FLOOP
0016   REL,%THKLO
0017   REL,%GJR
0018   REL,%RDVAL
0019   REL,%DARED
0020   REL,%WRVAL
0021   END
0001   FTN4,L
0002   C
0003          PROGRAM FILMC
0004   C
0005   C ***************************************************************
0006   C *
0007   C *  This is the main program for control of extrusion coating
0008   C *  using a 24 lane EDI flexible lip die. This program is
0009   C *  scheduled periodically by the computer operating system with
0010   C *  a period (usually 50 milliseconds) determined interactively
0011   C *  by the operator. Each time the program is scheduled it
0012   C *  performs different measurement and control tasks by calling
0013   C *  other program modules. The value of BCLOK which ranges
0014   C *  between 0 and 78 determines what tasks are to be called.
0015   C *
0016   C *  The first time FILMC is scheduled it in turn schedules the
0017   C *  program HP16. HP16 acquires and decodes the thickness data
0018   C *  for the HP16 gage and places the results in a system buffer
0019   C *  for use by the FILMC program.
0020   C *
```

```
0021  C *    When BCLOK is 1 to 27 subprograms TSCA1, TSCA2, TSCA3, TSCA4
0022  C *    and TSCA5 are called to acquire and calculate 24 different
0023  C *    temperatures from the 24 die bolts.
0024  C *
0025  C *    When BCLOK is 28 to 51 the subprogram FLOOP is called to
0026  C *    to update the temperature loop model and calculate the on
0027  C *    time for the heaters.
0028  C *
0029  C *    When BCLOK is 52 the subprogram DARED is called to retrieve
0030  C *    the thickness data from system storage and calculate the 24
0031  C *    lane thicknesses.
0032  C *
0033  C *    When BCLOK is 53 to 77 the subprogram THKLP updates the
0034  C *    system model and calculates new temperature set points.
0035  C *
0036  C *    When BCLOK is 78 it is reset to 0 and BOLTP is called to
0037  C *    to output data to the microcomputer for new time heater
0038  C *    time proportioned heater outputs.
0039  C *
0040  C *
0041  C *
0042  C ****************************************************************
0043  C
0044        COMMON REFSIG,PLTTEM,CTR,DCPON,SCANNO,IFLFL,MODE
0045        COMMON           G(24),U(24),THDIFT,PAR1,ADAPT,LANEST
0046        DIMENSION TK(24,2),TG(24,2),DC(24,24),A(24,3,3),C(24,3)
0047        INTEGER BCLOK,CCLOK,CTR,FIRPA,FIRSC,DATRDY,REFSIG,RESET,DCPON
0048        INTEGER ICLAS,IA,IB,LENBUF,INAME(3),CLASS,CNWD,IBUF(300)
0049        INTEGER TPCNT,DBPON,K,BUFR(24),SCANFL,ITIME(5),TIMDIF
0050        REAL BUFF(150)
0051        EQUIVALENCE(BUFF,IBUF)
0052        EXTERNAL TPCNT
0053        DATA INAME/'HP16   '/
0054  C
0055  C    SCHEDULE BOLT PROPORTIONER EACH 77 TRIPS THROUGH THIS ROUTINE
0056  C
0057  C
0058        ICOMP=7400B+15B
0059  C
0060  C    SET PRINTER ON 6 TO 132 COLUMNS
0061        WRITE(6,897)ICOMP
0062  897   FORMAT(2A)
0063  C
0064        BCLOK=0
0065        CLASS=0
0066        SCANNO=0
0067        IFLAG=0
```

```
0068            CNWD=100B
0069            LENBUF=300
0070            SCANFL=0
0071            IFLAG=0
0072            CTR=0
0073            WRITE(1,92)
0074    92      FORMAT(' CONTROL MODE:   TEMP ONLY (0) OR THICK CASCADE (1)?'
        )
0075            READ(1,98)MODE
0076    98      FORMAT(I1)

0077            IF(MODE .EQ. 0)GOTO 20
0078            WRITE(1,101)
0079    101     FORMAT(' DECOUPLER ON (1) OR OFF (2)?')
0080            READ(1,102)DCPON
0081    102     FORMAT(I1)
0082            WRITE(1,103)
0083    103     FORMAT(' ADAPTIVE THICKNESS CONTROLLER ON (1) OR OFF (2)?')
0084            READ(1,102)ADAPT
0085            WRITE(1,143)
0086    143     FORMAT(' NO. OF LANES ON EACH SIDE NOT IN CONTROL (Default=3
        )?')
0087            READ(1,102)LANEST
0088            IF(LANEST .LT. 1 .OR. LANEST .GT. 3)LANEST=3
0089    20      WRITE(1,110)
0090    110     FORMAT("ENTER STANDBY POWER (%) FOR DIE BOLT HEATERS")
0091    140     READ (1,120)DBPON
0092    120     FORMAT(I3)
0093            IF (DBPON.LE.0) THEN
0094               GOTO 5
0095            ELSE
0096               IF (DBPON.GT.99) THEN
0097                  GOTO 20
0098               ELSE
0099                  DO 40 K=1,24
0100                  BUFR(K)=DBPON+256*K
0101    40            CONTINUE
0102                  CALL WRVAL(TPCNT,BUFR)
0103                  CALL BOLTP
0104               ENDIF
0105            ENDIF
0106            WRITE (1,130)DBPON
0107    130     FORMAT("OPERATING AT ",I2,"%. PRESS CR TO CONT OR ENTER NEW
        %")
0108            GOTO 140
0109    C
0110    C       GET CLASS NUMBER
0111    C
0112    5       CALL EXEC(20,CNWD,IBUF,LENBUF,IDUM3,IDUM4,CLASS)
0113    C
0114    C       CONSUME CLASS NUMBER
0115    C
0116            CALL EXEC(21,CLASS+120000B,IBUF,LENBUF)
0117            ICLAS=CLASS+120000B !SET NO WAIT BIT AND SAVE CLASS NUMBER B
IT
0118    C
0119    C       SCHEDULE HP16 DATA ACQUISITION PROGRAM AND PASS CLASS NUMBER
0120    C
0121            CALL EXEC(10,INAME,CLASS)
0122    C
0123    C
0124    C       BEGINNING OF CONTROL OPERATION
0125    C
0126    C
0127    10      CONTINUE
0128    C
0129    C       GET AND PRINT OUT TIME
0130    C
0131    C       UPDATE BCLOK
0132    C
0133            IF(BCLOK .GT. 77) THEN
```

```
0134              BCLOK=0
0135           ELSE
0136              BCLOK=BCLOK+1
0137           ENDIF
0138           IF(BCLOK .EQ. 0) THEN
0139              CALL BOLTP
0140           ENDIF
0141    C
0142    C
0143    C     SCHEDULE TEMPERATURE SCAN 1 TIME TO GET REFERENCE CALIBRATION
0144    C
0145           IF (BCLOK.EQ.1) THEN
0146              CALL TSCA1
0147           ENDIF
0148    C
0149    C  SCHEDULE TEMPERATURE SCAN 1 TIME TO GET REFERENCE TEMPERATURE
0150    C
0151           IF (BCLOK.EQ.2) THEN
0152              CALL TSCA2
0153           ENDIF
0154    C
0155    C  SCHEDULE SUBROUTINE TO COMPUTE REFERENCE TEMPERATURE
0156    C  AND INITIATE THE FIRST TEMPERATURE MEASUREMENT
0157    C
0158           IF (BCLOK.EQ.3) THEN
0159              CALL TSCA3
0160              CALL TSCA4
0161           ENDIF
0162    C
0163           IF (BCLOK.GE.4) THEN
0164              IF (BCLOK.LE.26) THEN
0165                 CALL TSCA5
0166                 CALL TSCA4
0167              ELSE
0168                 IF (BCLOK.EQ.27) THEN
0169                    CALL TSCA5
0170                    CTR=0
0171                 ENDIF
0172              ENDIF
0173           ENDIF
0174    C  SCHEDULE TEMPERATURE CONTROL LOOP 24 TIMES EACH OUT OF 77 TRIPS
0175    C  THROUGH THIS ROUTINE
0176           IF(BCLOK .GE. 28)THEN
0177              IF(BCLOK .LE. 51)THEN
0178                 CCLOK=BCLOK-27
0179                 CALL FLOOP(CCLOK,TK,TG,A,C)
0180              ENDIF
0181           ENDIF
0182    C
0183    C  GET THICKNESS MEASUREMENTS FROM LFE AND IF THERE IS DATA THEN
0184    C  SCHEDULE DARED THICKNESS DATA REDUCTION PROGRAM
0185    C
0186           IF(MODE .EQ. 0)GOTO 703
0187           IF (BCLOK.EQ.52)THEN
0188              CALL EXEC(21,ICLAS,IBUF,LENBUF)
0189              CALL ABREG(IA,IB)
0190              IF(IA.GE.0)THEN
0191                 IF(BUFF(1) .LE. 0)GOTO 703
0192                 CALL DARED(BUFF)
0193              ENDIF
0194           ENDIF
0195           IF (BCLOK.GE.53.AND.BCLOK.LE.77)THEN
0196              IF(BUFF(1) .LE. 0)GOTO 703
0197              IF(IA.GE.0)THEN
0198                 LANE=BCLOK-52
0199                 CALL THKLO(LANE,TK,TG,DC)
0200              ENDIF
0201           ENDIF
```

```
0202   C
0203   C   SUSPEND
0204   C
0205   703    CONTINUE
0206   C
0207          CALL EXEC(6,0,1)
0208          GOTO 10
0209          END

0001   FTN4,L
0002          SUBROUTINE TSCA1
0003   C
0004   C   ****************************************************************
0005   C   *
0006   C   *    Five subprograms are called by FILMC to get temperature
0007   C   *    data from the CPI interface. This subprogram initiates
0008   C   *    the acquisition of the calibratation voltage across
0009   C   *    a precision resistor. This voltage is used to
0010   C   *    calibrate the RTD output once at the beginning of the
0011   C   *    the acquisition of the 24 temperature measurements.
0012   C   *
0013   C   *    The command format control word REFBU1 selects card
0014   C   *    slot 3, enables interrupt, and selects random access
0015   C   *    mode.  The data output format control word REFBU2
0016   C   *    sets the channel to 0 on the first gate card, and the
0017   C   *    full scale output to 102.4 mv. The data is acquired
0018   C   *    on the next cycle of FILMC by subprogram TSCA2.
0019   C   *
0020   C   ****************************************************************
0021   C
0022          INTEGER REFBU1,REFBU2
0023   C      SLOT3=3
0024   C      GAIN=3
0025   C      REFBU1=9*256+SLOT3
0026          REFBU1=2307
0027   C      REFBU2=GAIN-1
0028          REFBU2=2
0029   C
0030   C   Select card 3, enable interrupt, and select random access mode
0031   C
0032          CALL SECW(8,0,REFBU1,1)
0033   C
0034   C   Set gain to 102.4 millivolts on channel 0 of first gate card
0035   C
0036          CALL SECW(9,0,REFBU2,1)
0037          RETURN
0038          END
0039

0001   FTN4,L
0002          SUBROUTINE TSCA2
0003   C
0004   C   ****************************************************************
```

```
0005  C    *
      *
0006  C    *    Five subprograms are called by FILMC to get temperature
      *
0007  C    *    data from the CPI interface.  This subprogram acquires
      *
0008  C    *    the data for the calibration voltage initiated by
      *
0009  C    *    the subprogram TSCA1 and initiates the acquisition of
      *
0010  C    *    the temperature reference from the RTD.
      *
0011  C    *
      *
0012  C    *    The command format control word CTLWD selects card
      *                    CN
0013  C    *    slot 3, disables interrupt, and selects random access
      *
0014  C    *    mode. The data acquired from the card is placed in
      *
0015  C    *    buffer word REFSIG. The card is set up for the next
      *
0016  C    *    measurement by the command format control word REFBU1
      *
0017  C    *    which selects card slot 3, enables interrupt, and
      *
0018  C    *    selects random access. The data output format for the
      *
0019  C    *    RTD temperature measurement is set up by the word
      *
0020  C    *    RESBU1 which selects channel 1 on the first gate card
      *
0021  C    *    and the full scale output to 102.4 millivolts. The data
      *
0022  C    *    is acquired for the reference temperature by subprogram
      *
0023  C    *    TSCA3.
0024  C    *
      *
0025  C    ************************************************************
      *
0026
0027  C
0028        INTEGER REFSIG,REFBU1,RESBU1,CTLWD,CTR
0029        COMMON REFSIG,PLTTEM,CTR
0030  C     REFBU1=9*256+SLOT3
0031        REFBU1=2307
0032  C     RESBU1=16+GAIN-1
0033        RESBU1=18
0034  C     REFBU1=256*5+3
0035        CTLWD=1283

0036  C
0037  C  Select card address 3, disable interrupt, select random access
   mode
0038  C
0039        CALL SECW(8,0,CTLWD,1)
0040  C
0041  C  Get data and store in REFSIG
0042  C
0043        CALL SECR(9,0,REFSIG,1)
0044  C
0045  C  Select card address 3, enable interrupt, select random access
   mode
0046  C
0047        CALL SECW(8,0,REFBU1,1)
0048  C
0049  C  Select channel 1 and set gain to 102.4 mv fullscale
0050  C
0051        CALL SECW(9,0,RESBU1,1)
0052        RETURN
0053        END
```

```
0001  FTN4,L
0002        SUBROUTINE TSCA3
0003  C
0004  C    *****************************************************
0005  C    *
0006  C    *   This subroutine acquires the data for the RTD reference
0007  C    *   temperature and using the calibration data acquired by
0008  C    *   subprogram TSCA2 calculates the reference temperature for
0009  C    *   use in calculating the temperature in degrees Celsius of
0010  C    *   of the 24 thermal expansion bolts.
0011  C    *
0012  C    *   The RTD measurement is stored in RESSIG and the
0013  C    *   calculated value for reference temperature is stored in
0014  C    *   PLTTEM.
0015  C    *
0016  C    *****************************************************
0017
0018        COMMON REFSIG,PLTTEM
0019        INTEGER RESSIG,REFSIG,CTLWD
0020        DATA RA,RC/121.79,100.12/
0021  C
0022  C     RK=5500./(RA-RC)
0023        RK=253.81
0024  C     RD=RC/100.
0025        RD=1.0012
0026  C     CTLWD=256*5+3
0027        CTLWD=1283
0028  C
0029  C  Select card address 3 and turn off interrupt
0030  C
0031  C  Get data and store it in RESSIG
0032  C
0033        CALL SECW(8,0,CTLWD,1)
0034        CALL SECR(9,0,RESSIG,1)
0035        RRSSIG=RESSIG
0036        RRFSIG=REFSIG
0037        PLTTEM=RK*(RRSSIG/RRFSIG-RD)
0038        RETURN
0039        END 0001  FTN4,L
0002        SUBROUTINE TSCA4
0003  C
0004  C    *****************************************************
0005  C    *
0006  C    *   Five subprograms are called by FILMC to get temperature
0007  C    *   data from the CPI interface. This subprogram initiates
0008  C    *   the scan of each thermocouple. If thermocouples 1 thru
0009  C    *   6 are being scanned card address 3 and channels 2 thru
0010  C    *   7 of gate card 0 are selected. If thermocouples 7 thru
0011  C    *   14 are being scanned card address 3 and channels 0 thru
```

```
0012  C    *    7 of gate card 1 are selected.  If thermocouples 15
0013  C    *    thru 22 are scanned card address 6 and channels 0 thru
0014  C    *    7 of gate card 0 are selected. For thermocouples 23 and
0015  C    *    24 card address 6 and channels 0 and 1 of gate card 1
0016  C    *    are selected.
0017  C    *
0018  C    *    The thermocouple data set up by this subroutine are
0019  C    *    read by subroutine TSCA5.
0020  C    *
0021  C    ***********************************************************
0022  C
0023  C
0024       COMMON REFSIG,PLTTEM,CTR
0025       INTEGER TEMBU3,CCRD1,CCRD2,CTR,TEMBU1,TEMBU2,GAIN
0026       INTEGER CHAN,REFSIG
0027       DATA GAIN/3/
0028  C
0029  C       INITIALIZE
0030  C
0031  C    CCRD2=9*256+SLOT6
0032       CCRD2=2310
0033  C    CCRD1=9*256+SLOT3
0034       CCRD1=2307
0035  C    GET 24 TEMPERATURES
0036  C
0037       CTR=CTR+1           !CTR is set to 0 by FILMC program
0038       CHAN=CTR+1
0039       IF (CTR.GT.14)CHAN=CHAN-16
0040       TEMBU2=CHAN*16+GAIN
0041       IF (CTR .LE. 14) THEN
0042          TEMBU1=CCRD1
0043       ELSE
0044          TEMBU1=CCRD2
0045       ENDIF
0046  C
0047  C    Set up control word to get temperature
0048  C
0049       CALL SECW(8,0,TEMBU1,1)
0050  C
0051  C    Send control word to get temperature
0052  C
0053       CALL SECW(9,0,TEMBU2,1)
0054  C
0055       RETURN
0056       END
0001  FTN4,L
0002       SUBROUTINE TSCA5
0003  C
0004  C    ***********************************************************
0005  C    *
0006  C    *    Five subprograms are called by FILMC to get temperature
0007  C    *    data from the CPI interface.  This subprogram reads the
0008  C    *    thermocouple output voltage, corrects for thermocouple
0009  C    *    nonlinearity and adds the reference offset voltage.
```

```
0010  C     *    The resulting temperature measurement is stored in the
0011  C     *    data base under TPCUR by calling the WRVAL subprogram.
0012  C     *
0013  C     ****************************************************************
0014  C
0015        EXTERNAL TPCUR
0016        COMMON REFSIG,PLTTEM,CTR
0017        DIMENSION C(4)
0018        REAL TEMPER,TEMBUF,PLTTEM,SCALE
0019        INTEGER TEMBU3,CARD1,CARD2,CTR,IDATA,REFSIG
0020        DATA C(1),C(2),C(3)/1.9323799E-2,-1.0306020E-7,3.7084018E-12/
0021        DATA C(4)/-5.1031937E-17/
0022  C
0023  C     Initialize
0024  C
0025        SCALE=5
0026  C
0027  C     CARD2=5*256+SLOT6
0028        CARD2=1286
0029  C     CARD1=5*256+SLOT3
0030        CARD1=1283
0031  C     Get 24 Temperatures. The counter CTR is setup by the subprogram TSCA4
0032  C     which initiates the temperature measurement.
0033  C
0034        IF (CTR .LE. 14) THEN
0035            TEMBU3=CARD1
0036        ELSE
0037            TEMBU3=CARD2
0038        ENDIF
0039  C
0040  C.    Get thermocouple output stored in 11 bits which = 10.24 full scale
0041  C     The gate card and channel were previously set up by subprogram TSCA4
0042  C     which set the card up for a measurement on the previous cycle.
0043  C
0044        CALL SECW(8,0,TEMBU3,1)
0045        CALL SECR(9,0,IDATA,1)
0046        TEMBUF=IDATA
0047  C
0048  C     Compute Temperature
0049  C
0050        TEMBUF=TEMBUF*SCALE
0051        TEMPER=TEMBUF*(C(1)+TEMBUF*(C(2)+TEMBUF*(C(3)+TEMBUF*C(4))))
0052        TEMPER=TEMPER+ PLTTEM
0053  C
0054  C     Store Temperature
0055  C
0056        IF(CTR .LT. 1)GOTO 101
0057        IF(CTR .GT. 24)GOTO 101
0058  C
0059  C        CHECK FOR TEMPERATURE FLYERS!!!
0060  C
0061        CALL RDVAL(TPCUR,TLAST,CTR)
0062        IF(TLAST .LE. 25)GOTO 123
0063        IF(ABS(TLAST-TEMPER) .GE. 10.)TEMPER=TLAST
0064    123 CONTINUE
0065        CALL WRVAL(TPCUR,TEMPER,CTR)
0066    101 RETURN
0067        END
```

```
0001  FTN4,L
0002        SUBROUTINE BOLTP
0003  C
0004  C    ***********************************************************
0005  C    *
0006  C    * Program to transfer percentage time on of the die bolt heaters *
0007  C    * to the microcomputer through the parallel interface card (PIC).*
0008  C    * This program is called by the FILMC program and retrieves data *
0009  C    * stored in the data base under TPCNT.
0010  C    *
0011  C    *
0012  C    *
0013  C    ***********************************************************
0014  C
0015  C
0016        INTEGER BUFR(24), CNTWD, BUFLN, PRAM1, PARMS(5)
0017        INTEGER TPCNT
0018        EXTERNAL TPCNT
0019
0020
0021        PRAM1 = 0
0022        BUFLN = 24
0023
0024  C    Clear and reset PIC
0025        CNTWD = 40014B
0026        CALL EXEC(3, CNTWD, PRAM1)
0027
0028  C    Set DVP1 value (driver parameter #1)
0029        CNTWD = 44014B
0030        CALL EXEC(3, CNTWD, PRAM1)
0031
0032  C    Get percentage data from PIR
0033  C
0034        CALL RDVAL(TPCNT,BUFR)
0035  C
0036  C    Output data to parallel card
0037  C
0038        CNTWD = 40014B
0039        CALL EXEC(2, CNTWD, BUFR, BUFLN, PRAM1)
0040
0041
0042  C
0043  C        Get & report status of the card.
0044  C        CALL EXEC(3, 40614B, PRAM1)
0045  C
0046  C        CALL RMPAR(PARMS)
0047  C
0048

0001  FTN4,L
0002        SUBROUTINE FLOOP(J,TK)                        201
0003        COMMON REFSIG,PLTTEM,CTR,DCPON,SCANNO
0004        EXTERNAL TPER0,TPER1,TPER2,TPCUR,TPPRO,TPWND,TPACH,TPACL,TPSET,T
              1PCNT
0005
0006        INTEGER TON,IKNT,CTR,REFSIG,DCPON,FIRPA,FIRSC,RESET,DATRDY
0007        DIMENSION OK(24,2),TK(24,2),X(24),P(24,25),S(24),A(24,3,3),C(24,3)
```

```
0008            DIMENSION BIA(24)
0009            REAL KPT
0010            CALL RDVAL(TPER1,TER1,J)
0011            CALL RDVAL(TPER2,TER2,J)
0012            CALL RDVAL(TPCUR,TEMP,J)
0013            CALL RDVAL(TPPRO,KPT,J)                  } 202
0014            CALL RDVAL(TPWND,TPT,J)
0015            CALL RDVAL(TPACH,TLAM,J)
0016            CALL RDVAL(TPACL,TTDER,J)
0017            CALL RDVAL(TPSET,TSET,J)
0018            TER=TSET-TEMP                            — 74
0019            IF(KPT .LE. 0 .OR. TPT .LE. 0)THEN
0020               KPT=0.75
0021               TPT=900                               } 203
0022            ENDIF
0023            IF(KPT .GE. 10)KPT=10
0024            IF(TPT .GE. 1500)TPT=1500                — 204
0025            CALL RDVAL(TPCNT,TON,J)
0026            TK(J,1) = TK(J,2)
0027            OK(J,1) = OK(J,2)
0028            TK(J,2) =TEMP
0029            OK(J,2) =TON
0030            IF(IFLFL .GT. 0)GOTO 600
0031            TK(J,1)=TK(J,2)
0032            OK(J,1)=OK(J,2)
0033            A(J,1,1)=TK(J,1)*TK(J,1)
0034            A(J,1,2)=TK(J,1)*OK(J,1)
0035            A(J,1,3)=TK(J,1)                         } 205
0036            A(J,2,2)=OK(J,1)*OK(J,1)
0037            A(J,2,3)=OK(J,1)
0038            C(J,1)=A(J,1,1)
0039            C(J,2)=A(J,1,2)
0040            C(J,3)=A(J,1,3)
0041            IF(J .EQ. 24)IFLFL=1
0042       600  CONTINUE
0043            Q=0.1813
0044            R=1-Q
0045            A(J,1,3)=Q*TK(J,1)+R*A(J,1,3)
0046            A(J,1,1)=Q*TK(J,1)*TK(J,1)+R*A(J,1,1)
0047            A(J,1,2)=Q*TK(J,1)*OK(J,1)+R*A(J,1,2)    } 206
0048            A(J,2,1)=A(J,1,2)
0049            A(J,2,2)=Q*OK(J,1)*OK(J,1)+R*A(J,2,2)
0050            A(J,2,3)=Q*OK(J,1)+R*A(J,2,3)
0051            A(J,3,1)=A(J,1,3)
0052            A(J,3,2)=A(J,2,3)
0053            A(J,3,3)=1
0054            C(J,1)=Q*TK(J,2)*TK(J,1)+R*C(J,1)
0055            C(J,2)=Q*TK(J,2)*OK(J,1)+R*C(J,2)

0056            C(J,3)=Q*TK(J,2)+R*C(J,3)                — 206
0057            IF(J .EQ. 24)IFLFL=IFLFL+1
0058            TSAMP=30
0059            CON2=EXP(-TSAMP/TPT)                     } 207
0060       703  PREDT=CON2*TK(J,1)+KPT*(1-CON2)*OK(J,2)+BIA(J)
0061   C        WRITE(1,967)J,TEMP,PREDT
0062       967  FORMAT(5X,'LANE ',I2,,' TEMP ',F6.2,' PREDT ',F6.2)
0063            IF(ABS(PREDT-TEMP) .LE. 0.3)GOTO 801     — 208
0064   C        DO 608 I=1,3
0065   C        WRITE(1,607)(A(J,I,L),L=1,3),C(J,I),IFLFL
0066   C   608  CONTINUE
0067       607  FORMAT(5X,4(F10.4,3X),I4)
0068            IF(IFLFL .LE. 5)GOTO 801
0069            DO 709 I=1,3
0070            DO 710 L=1,3                             } 209
0071       710  P(I,L)=A(J,I,L)
0072       709  S(I)=C(J,I)
0073            CALL GJR(P,8,X,3,1,NRET)
0074            IF(NRET .EQ. 0)GOTO 801
0075   C        WRITE(1,607)(X(I),I=1,3),0,IFLFL
0076            IF(X(1) .LE. 0)GOTO 801
0077            TPT=-TSAMP/ALOG(X(1))
```

```
0078          BIA(J)=X(3)
0079          KPT=X(2)/(1-X(1))                        ———— 210
0080      801 CONTINUE
0081          IF(KPT .LE. 0 .OR. TPT .LE. 0)THEN
0082            KPT=0.75
0083            TPT=900
0084          ENDIF
0085          IF(KPT .GE. 10)KPT=10
0086          IF(TPT .GE. 1500)TPT=1500
0087          IF(KPT .LE. 0.1)KPT=0.1
0088          CON1=EXP(-TSAMP/TLAM)
0089          CON2=EXP(-TSAMP/TPT)
0090          TX=TER
0091          IF(TX .GT. 10)TX=10                                     } 82
0092          IF(TX .LT. -10)TX=-10
0093          TON=OK(J, 2)+(1-CON1)/(KPT*(1-CON2))*TER-(CON2-CON1*CON
0094         12)/(KPT*(1-CON2))*TER1+TTDER*TX
0095          IF(TON .GT.  99)TON=99
0096          IF(TON .LT. 0)TON=0
0097      800 CONTINUE
0098          CALL WRVAL(TPPRO,KPT,J)
0099          CALL WRVAL(TPWND,TPT,J)
0100          CALL WRVAL(TPCNT,TON,J)                } 211
0101          CALL WRVAL(TPERO,TER,J)
0102          CALL WRVAL(TPER1,TER,J)
0103          CALL WRVAL(TPER2,TER1,J)
0104          RETURN                    ———— 212
0105          END
0001     FTN4,L
0002          PROGRAM DSTOR
0003     C
0004     C ****************************************************************
0005     C *                                                              *
0006     C * Program to receive data from the LFE program and store it    *
0007     C * on the disk. The program is called by the LFE program        *
0008     C * which gets thickness data from the LFE gage.                 *
0009     C *                                                              *
0010     C *    The data is stored in 'PROFIL' as follows:                *
0011     C *                                                              *
0012     C *       TIME - WORDS 1 TO 5                                    *
0013     C *       LENGTH OF DATA - WORD 6                                *
0014     C *       DATA - STARTS AT WORD 7                                *
0015     C *                                                              *
0016     C *                                                              *
0017     C *                                                              *
0018     C ****************************************************************
0019     C
0020     C
0021          INTEGER IDCB(272),IBUF(256),INAM(3),ISIZ(2),IBUFF(256)
0022          INTEGER ITIME(5),ILEN,IA,IB,IBUF2(128)
0023          EQUIVALENCE(ITIME,IBUF)
0024          EQUIVALENCE(IB,IBUF(6))
0025          EQUIVALENCE(IBUF(129),IBUF2)
0026          EQUIVALENCE(IBUFF,IBUF(7))
0027          DATA INAM/2HPR,2HOF,2HIL/
0028          DATA ISIZ/256,128/       !256 BLOCKS,128 WORD PER BLOCK
0029          ITYPE=2
0030          ILEN=256
0031          IOPTN=1                       !CAN BE CALLED FROM SEVERAL PROGRAMS
0032          ICR=-17                       !LU
0033          INUM=1                        !FILE RECORD NUMBER
0034     C
0035     C    PURGE FILE 'PROFIL' IF IT EXISTS
0036     C
0037          CALL PURGE(IDCB,IERR,INAM)
0038     C
0039     C    CREATE FILE 'PROFIL' ON CARTRIDGE 17
0040     C
0041          CALL CREAT(IDCB,IERR,INAM,ISIZ,ITYPE,0,ICR)
0042          IF(IERR.LT.0)THEN
```

```
0043            IFLAG=1
0044            GOTO 999
0045            ENDIF
0046    C
0047    C   CLOSE FILE
0048    C
0049            CALL CLOSE(IDCB)
0050
0051    C
0052    C   GET DATA AND STORE IN NEXT RECORD OF 'PROFIL'
0053    C
0054    10      CONTINUE
0055    C
0056    C   GET DATA FROM FATHER  -  ILEN IS THE LENGTH OF DATA BUFFER
0057    C
0058            CALL EXEC(14, BUFF,ILEN)
0059
0060            CALL ABREG(IA,IB)
0061            IF(IA.EQ.1)GOTO 999        !IF IA=1 THEN NO DATA IS PRESENT
0062    C
0063    C   GET TIME; TIME(2)=SECS, TIME(3)=MINUTES, TIME(4)=HOURS
0064    C
0065            CALL EXEC(11,ITIME)
0066    C
0067    C   OPEN FILE
0068    C
0069            CALL OPEN(IDCB,IERR,INAM,IOPTN,0,ICR)
        C-
0070            IF(IERR.LT.0)THEN
0071              IFLAG=2
0072              GOTO 999
0073              ENDIF
0074    C
0075    C   WRITE NEXT RECORD (INUM IS RECORD NUMBER)
0076    C
0077            CALL WRITF(IDCB,IERR,IBUF,256,INUM)
0078            INUM=INUM+1                    !INCREMENT RECORD NUMBER
0079            IF(IERR.LT.0)THEN
0080              IFLAG=3
0081              GOTO 999
0082              ENDIF
0083            CALL WRITF(IDCB,IERR,IBUF2,128,INUM)
0084            INUM=INUM+1
0085    C
0086    C   CLOSE FILE
0087    C
0088            CALL CLOSE(IDCB)
0089            GOTO 20
0090    C
0091    C   ERROR HANDLER
0092    C
0093    999     WRITE(1,99)IFLAG,IERR
0094    99      FORMAT("FILE ACCESS ERROR AT LOCATION ",I2,"ERR CODE",I3)
0095    C
0096    C   SUSPEND
0097    C
0098    20      CALL EXEC(6,0,1)
0099    C
0100    C   GO BACK FOR MORE WHEN CALLED AGAIN
0101    C
0102            GOTO 10
0103            END
0001    FTN4,L
0002            SUBROUTINE THKLO(M,TK,TG,DC)        — 300
0003    C*******************************************************************
***
0004    C**
**
```

```
0005  C**                      SUBROUTINE THKLO(M,TK,TG,DC)
      **
0006  C**
      **
0007  C**  This subroutine is the primary control program for the film
      **
0008  C**  thickness loop.  It is called from the mainline program,
      **
0009  C**  FILMY, once per lane each sample. Parameters passed are:
      **
0010  C**
      **
0011  C**                  M --- The lane number;
      **
0012  C**                        1 to 24 --- Actual bolt #
      **
0013  C**                         25     --- Decoupler calculation
      **
0014  C**                  TK --- The matrix of temperature values
      **
0015  C**                         of the bolts; from the 2 last scans.
      **
0016  C**                  TG --- The matrix of filtered temperatures.
0017  C**
      **
0018  C**
      **
0019  C**  Control variable data, lane thickness, is passed into this
      **
0020  C**  program through the EXTERNAL buffers:
      **
0021  C**
      **
0022  C**                  THCUR --- The matrix of most recent thicknesses
      **
0023  C**                  THSET --- The matrix of thickness setpoints
      **
0024  C**                  THPRO --- The matrix of controller gains
      **
0025  C**                  THDED --- The matrix of reset times
      **
0026  C**                  THWND --- The matrix of derivative times
      **
0027  C**
      **
0028  C**  Sample time, TS,is also passed into program through COMMON.
      **
0029  C**  This program then calculates and stores the following buffers
      ***
0030  C**
      **
0031  C**                  THERO --- The matrix of current thickness error
      **
0032  C**                  THER1 --- The matrix of past sample errors
      **
0033  C**                  THER2 --- The matrix of errors 2 samples past
      **
0034  C**                  TPSET --- The matrix of calculated temp setpts
      **
0035  C**
      **
0036  C**
      **
0037  C**  The control strategy first checks to see if the process model
      **
0038  C**  for lane M adequately describes the actual process data.  If
      **
0039  C**  not, the program calls the identification routine which is a
      **
0040  C**  least squares estimator.  The estimator calculates the value
```

```
0041 C**  of two parameters, the process gain relating thickness to
0042 C**  bolt temperature and the lane interaction constant that
0043 C**  describes the effect that a change in bolt temperature on lane
0044 C**  I has on thickness in lanes I+1 and I-1.  The parameters that
0045 C**  are chosen are the values which minimize the squared error
0046 C**  between model prediction and recent process data.
0047 C**  The control algorithm for each lane is a discrete version of
0048 C**  the velocity form of the PID controller.  Each time the
0049 C**  program is called for M=1 to 24 the controller output, change
0050 C**  in temperature setpoint, is calculated from the PID algorithm
0051 C**  for that lane.  When the program is called and M=25, the
0052 C**  decoupler is calculated by inverting the gain matrix.  The 24
0053 C**  individual outputs are then modified by the decoupler to
0054 C**  negate the effect of lane to lane interaction.  Then the
0055 C**  updated values of controller output are placed in the EXTERNAL
0056 C**  buffer, TPSET, and program control is returned to FILMY.
0057 C**
0058 C**
0059 C**
0060 C**
0061 C**
0062 C**
0063 C**
0064 C*******************************************************************
0065       COMMON REFSIG,PLTTEM,CTR,DCPON,SCANNO,IFLFL,MODE
0066       COMMON G(24),U(24),THDIFT,PAR1,ADAPT,LANEST
0067       EXTERNAL TPSET,THERO,THER1,THER2,THCUR,TSCN1,THPRO,THDED,THWND
0068       EXTERNAL THSET,TPCNT,TPCUR,TSCN2
0069       INTEGER DCPON,REFSIG,CTR,FIRPA,FIRSC,RESET,DATRDY,TN(24),XX
0070       INTEGER CONLO,CONHI
0071       REAL MULT
0072       DIMENSION THC(24), THK(24),TMP(24),P(24,25),Q(24),H(24),GI(24,24)
0073       DIMENSION UD(24),IA(2),TK(24, 2),T1(24),TP(24),TC(24),KML(24,24)
0074       DIMENSION ITIME(5),DC(24,24),AX(8),FX(8),TG(24,2),NU(24),INAM(3)
0075       EQUIVALENCE (AVE,IH(1))
0076       DATA INAM/2HDS,2HFL,2H3 /
0077       TS=160./60.
0078       DCPFLG=0
0079 C
0080       IF(M .EQ. 1)THDIFT=0
0081       IF(SCANNO .GT. 0)GOTO 544
0082       CALL RDVAL(THCUR,TH,M)
0083       CALL WRVAL(TSCN1,TH,M)
```

```
0084        ACERR=.02
0085        PAR1=0.6
0086        GAVE=-.0625
0087    544 IF(M .EQ. 25)GOTO 32
0088        G(M)=-.0625
0089        CALL RDVAL(THCUR,THCKA,M) ———— 301
0090        CALL WRVAL(TSCN2,THCKA,M)    ⎫
0091        CALL RDVAL(TSCN1,TFILT,M)    ⎬ 302
0092        FILT=.50                     ⎪
0093        THCKA=FILT*THCKA+(1.-FILT)*TFILT
0094        CALL WRVAL(THCUR,THCKA,M)
0095        THK(M) = THCKA-2

0096        DO 78 I=1,24
0097        TMP(I) = TG(I,1)
0098     78 CONTINUE
0099        IF(DCPON .NE. 1)GOTO 200
0100        IF(ADAPT .NE. 1)GOTO 200
0101        THCKP=2
0102        DO 4 J=1,24
0103        KM=ABS(M-J)
0104        MULT=PAR1**KM
0105        IF(KM .GT. 4)MULT=0
0106        THCKP=THCKP+G(M)*TMP(J)*MULT
0107      4 CONTINUE
0108        THDIF=THCKP-THCKA
0109        THDIFT=THDIFT+ABS(THDIF)
0110        IF(ABS(THCKP-THCKA)/THCKA .LT. ACERR)GOTO 200
0111        DIV=0
0112    403 DO 727 I=1,24
0113        KM=ABS(M-I)
0114        MULT=PAR1**KM
0115        IF(KM .GT. 4)MULT=0
0116        DIV=DIV+MULT*TMP(I)
0117    727 CONTINUE
0118        G(M)  =THK(M)/DIV
0119        IF(M .EQ. 1)GOTO 404
0120        IF(G(M)   .GE. 0)G(M)  =G(M-1)
0121        GOTO 405
0122    404 IF(G(1)   .GE. 0)G(1)  =-.0625
0123    405 DCPFLG=1
0124    200 CALL RDVAL(TPSET,TMPSP,M)  ⎫
0125        CALL RDVAL(THER0,TE1,M)    ⎪
0126        CALL RDVAL(THER1,TE2,M)    ⎪
0127        CALL RDVAL(THPRO,PB,M)     ⎪
0128        CALL RDVAL(THDED,TI,M)     ⎬ 302
0129        CALL RDVAL(THWND,TD,M)     ⎪
0130        CALL RDVAL(THSET,SET,M)    ⎪
0131        CALL RDVAL(THCUR,TH,M)     ⎭
0132        CALL RDVAL(TPCUR,TMPCU,M)
0133        THF=TH-8./64.*(TMPSP-TMPCU)
0134        TE=SET-THF ———————————————— 74
0135        CONLO=LANEST
0136        CONHI=25-LANEST
0137        IF(M .LE. CONLO .OR. M .GE. CONHI)GO TO 709 —— 303
0138        IF(SCANNO .EQ. 0) THEN       ⎫
0139        TE1=TE                       ⎪
0140        TE2=TE                       ⎬ 70
0141        ENDIF                        ⎪
0142        IF(SCANNO .EQ. 1)TE2=TE1     ⎪
0143    708 U(M)=100/PB*(TE-TE1+TS/TI*TE+TD/TS*(TE-2*TE1+TE2)) ⎭
0144    709 CONTINUE
0145        CALL WRVAL(TSCN1,THCKA,M) ⎫
0146        CALL WRVAL(THER0,TE,M)    ⎬ 304
0147        CALL WRVAL(THER1,TE1,M)   ⎪
0148        CALL WRVAL(THER2,TE2,M)   ⎭
0149        IF(M .NE. 25)GOTO 30 ———— 305
0150      C
```

```
0151 C******** NOW CHECK TO SEE HOW MANY LANES ON EACH SIDE WILL BE NEGLECTED
0152   C
0153        32 IF(LANEST .NE. 3)GOTO 33
0154   C
0155   C******** USE THE ALGORITHM BELOW FOR 3 UNCONTROLLED LANES ON EACH SIDE
0156   C
0157        36 U(1)=.25*U(4)
0158           U(2)=.50*U(4)
0159           U(3)=.75*U(4)
0160           U(22)=.75*U(21)
0161           U(23)=.50*U(21)
0162           U(24)=.25*U(21)
0163           GOTO 35
0164        33 IF(LANEST .NE. 2)GOTO 34
0165   C
0166   C******** USE THE ALGORITHM BELOW FOR 2 UNCONTROLLED LANES ON EACH SIDE
0167   C
0168           U(1)=.33*U(3)
0169           U(2)=.67*U(3)
0170           U(24)=.33*U(22)
0171           U(23)=.67*U(22)
0172           GOTO 35
0173        34 IF(LANEST .NE. 1)GOTO 36
0174   C
0175   C******* USE THE ALGORITHM BELOW FOR 1 UNCONTROLLED LANE ON EACH SIDE
0176   C
0177           U(1)=.5*U(2)
0178           U(24)=.5*U(23)
0179        35 CONTINUE
0180           IF(DCPON .NE. 1)GOTO 31
0181           IF(ADAPT .NE. 1)GOTO 750
0182           CALL RDVAL(THSET,AVTHIK,12)
0183           IF(THDIFT/(24*AVTHIK)    .LT. .1)GOTO 666
0184           AL=PAR1-.3
0185           AH=PAR1+.3
0186           IF(AH .GT. .75)AH=.75
0187           IF(AL .LT. .25)AL=.25
0188           A=AL
0189           XX=1
0190           CALL RDVAL(THCUR,THC)
0191           DO 501 KNTR=1,6
0192       512 DO 502 K=1,24
0193           THK(K)=THC(K)-2
0194           DO 503 I=1,24
0195       503 TMP(I)=TG(I,1)
0196           DIV=0
0197           DO 504 I=1,24
0198           KM=ABS(K-I)
0199           MULT=A**KM
0200           IF(KM .GT. 4)MULT=0
0201       504 DIV=DIV+MULT*TMP(I)
0202       502 G(K)   =THK(K)/DIV
0203       507 XSUM=0
0204           DO 505 I=1,24
0205       505 XSUM=XSUM+G(I)
0206           GAVE=XSUM/24
0207           KWIT=0
0208           DO 506 I=1,24
0209           ERR=G(I)-GAVE
0210           IF(ABS(ERR)/GAVE .LT. .8)GOTO 506
0211           KWIT=1
0212           G(I)=GAVE
0213       506 CONTINUE
0214           IF(KWIT .EQ. 1)GOTO 507
0215           THDIF=0
0216           DO 508 K=1,24
0217           THCKP=2
```

```
0219          DO 509 I=1,24
0220          KM=ABS(K-I)
0220          MULT=A**KM
0221          IF(KM .GT. 4)MULT=0
0222      509 THCKP=THCKP+GAVE*TMP(I)*MULT
0223      508 THDIF=THDIF+ABS(THCKP-THC(K))
0224          IF(GAVE .GE. 0)THDIF=THDIF+1.E30
0225          IF(KNTR .NE. 1)GOTO 511
0226          IF(XX .GT. 8)GOTO 511
0227          AX(XX)=A
0228          FX(XX)=THDIF
0229          XX=XX+1
0230          A=A+.125*(AH-AL)
0231          IF(XX .NE. 9)GOTO 512
0232          FKEEP=1E30
0233          DO 513 I=1,8
0234          IF(FX(I) .GT. FKEEP)GOTO 513
0235          IKEEP=I
0236          FKEEP=FX(I)
0237      513 CONTINUE
0238          AS=AX(IKEEP)
0239          FS=FX(IKEEP)
0240          IL=IKEEP-1
0241          IF(IL .LE. 1)IL=1
0242          AL=AX(IL)
0243          IH=IKEEP+1
0244          IF(IH .GE. 8)IH=8
0245          AH=AX(IH)
0246          A=AL+.618*(AH-AL)
0247          GOTO 501
0248      511 F=THDIF
0249          IF(A .LT. AS)GOTO 514
0250          IF(F .GT. FS)GOTO 515
0251          AL=AS
0252          AS=A
0253          FS=F
0254          A=AL+.618*(AH-AL)
0255          GOTO 501
0256      515 AH=A
0257          A=AH-.618*(AH-AL)
0258          GOTO 501
0259      514 IF(F .GT. FS)GOTO 516
0260          AH=AS
0261          AS=A
0262          FS=F
0263          A=AH-.618*(AH-AL)
0264          GOTO 501
0265      516 AL=A
0266          A=AL+.618*(AH-AL)
0267      501 CONTINUE
0268          IF(ABS(PAR1-A) .LT. .03)GOTO 665
0269          PAR1=A
0270          DO 518 I=1,24
0271          G(I)=GAVE
0272          DO 518 J=1,24
0273      518 P(I,J)=0
0274      750 IF(ADAPT .NE. 1 .AND. SCANNO .GT. 0)GOTO 666
0275          DO 519 MM=1,24
0276          DO 520 I=1,24
0277          KM=ABS(I-MM)
0278          P(MM,I)=PAR1**KM
0279          IF(KM .GT. 4)P(MM,I)=0
0280      520 CONTINUE
0281          Q(I)=1.
0282      519 CONTINUE
0283          CALL GJR(P,Q,Q,24,0,NRET)
0284          IF(NRET .EQ. 0)GOTO 31
0285  762     DO 99 I=1,24
0286          DO 98 J=1,24
0287      98 GI(I,J)=P(I,J)/GAVE
0288          IF(GI(I,I) .NE. 0)GOTO 517
```

```
0289            H(I)=0
0290            GOTO 99
0291      517   H(I)=1/GI(I,I)
0292       99 CONTINUE
0293            DO 20 I=1,24
0294            DO 20 J=1,24
0295       20   DC(I,J)=GI(I,J)*H(I)
0296      665 PB=100*GAVE/.924
0297            DO 668 I=1,24
0298            CALL WRVAL(THPRO,PB,I)
0299      668 CONTINUE
0300      666   DO 21 I=1,24
0301            UD(I)=0.
0302            DO 22 J=1,24
0303            IF(ABS(J-I) .GT. 4)GOTO 22
0304            UD(I)=UD(I)+U(J)*DC(I,J)
0305       22 CONTINUE
0306       21 CONTINUE
0307            DO 25 I=1,24
0308       25   WRITE(1,202)I,U(I),UD(I)
0309      202 FORMAT(' I=',I4,' NORMAL CHANGE= ',F10.3,' DECOUPLED CHANGE=
0310          1 ',F10.3)
0311            IFLAG=1
0312            DO 26 I=1,24
0313            CALL RDVAL(TPSET,TMPST,I)
0314            TMPO=TMPST
0315            TMPST=TMPST+UD(I)
0316            IF(TMPST .LT. 25)TMPST=25
0317            IF(TMPST .GT. 250)TMPST=250
0318     C      WRITE(1,203)I,TMPO,TMPST
0319            CALL WRVAL(TPSET,TMPST,I)
0320       26 CONTINUE
0321            GOTO 40
0322       31   DO 27 I=1,24
0323            CALL RDVAL(TPSET,TMPST,I)
0324            CALL RDVAL(TPCUR,TMPCU,I)
0325            TMPO=TMPST
0326            TMPST=TMPST+U(I)
0327            IF(TMPST .LT. 25)TMPST=25
0328            IF(TMPST .GT. 250)TMPST=250
0329     C      WRITE(1,203)I,TMPO,TMPST
0330      203 FORMAT(' LANE',I3,' OLD TEMP SP:',F10.2,' NEW SP:',F10.2)
0331            CALL WRVAL(TPSET,TMPST,I)
0332       27 CONTINUE
0333       40 CALL EXEC(11,ITIME)
0334            CALL RDVAL(THSET,SET,12)
0335            WRITE(6,41)ITIME(4),ITIME(3),ITIME(2),SET
0336       41 FORMAT(/,10X,I2,':',I2,':',I2,5X,'TH. SETPT.=',F5.3)
0337            CALL RDVAL(THCUR,T1)
0338            CALL RDVAL(TPSET,TP)
0339            CALL RDVAL(TPCUR,TC)
0340            CALL RDVAL(TPCNT,TN)
0341            DO 301 L=1,24
0342            TN(L)=IAND(377B,TN(L))
0343      301 CONTINUE
0344            DO 712 JJ=1,24
0345      712 NO(JJ)=JJ
0346            DO 442 KK=1,2
0347            IL=1
0348            IH=12
0349            IF(KK .EQ. 1)GOTO 50
0350            IL=13
0351            IH=24
0352       50 WRITE(6,713)(NO(II),II=IL,IH)
0353            WRITE(6,43)(T1(II),II=IL,IH)
0354            WRITE(6,44)(TP(II),II=IL,IH)
0355            WRITE(6,45)(TC(II),II=IL,IH)
0356            WRITE(6,46)(TN(II),II=IL,IH)
0357      442 CONTINUE
```

```
0358              AVG=SET
0359       C      CALL EXEC(10,INAM,IA(1),IA(2))  —— 311
0360           43 FORMAT(' THICK. ',12(2X,F6.3))
0361          713 FORMAT(/,' LANE #',12(4X,I2,2X))
0362           44 FORMAT(' TP.SP.',12(2X,F6.1))
0363           45 FORMAT(' TEMP  ',12(2X,F6.1))
0364           46 FORMAT(' % ON  ',12(2X,I6))
0365           30 IF(M .EQ. 25)SCANNO=SCANNO+1 —— 306
0366              RETURN
0367              END
0001       FTN4,L
0002              SUBROUTINE GJR(A,C,X,N,INDIC,NRET)
0003              DIMENSION A(24,25),C(24),X(24),IROW(24),JCOL(25),JORD(25),Y(
           25)
0004       C     .......BEGIN ELIMINATION PROCEDURE..........
0005              DO 10 I=1,N
0006           10 A(I,N+1)=C(I)
0007              MAX=N
0008              IF(INDIC .GE. 0)MAX=N+1
0009            5 DETER=1
0010              DO 18 K=1,N
0011              KM1=K-1
0012       C
0013       C     .........SEARCH FOR THE PIVOT ELEMENT............
0014              PIVOT=0
0015              DO 11 I=1,N
0016              DO 11 J=1,N
0017       C     .........SCAN IROW AND JCOL ARRAYS FOR INVALID PIVOT SUBSCRI
           PTS......
0018              IF(K .EQ. 1)GOTO 9
0019              DO 8 ISCAN=1,KM1
0020              DO 8 JSCAN=1,KM1
0021              IF(I .EQ. IROW(ISCAN))GOTO 11
0022              IF(J .EQ. JCOL(JSCAN))GOTO 11
0023            8 CONTINUE
0024            9 IF(ABS(A(I,J)) .LE. ABS(PIVOT)) GOTO 11
0025              PIVOT=A(I,J)
0026              IROW(K)=I
0027              JCOL(K)=J
0028           11 CONTINUE
0029       C
0030       C     .....INSURE THAT SELECTED PIVOT IS LARGER THAN EPS .........
           .....
0031              IF(ABS(PIVOT) .GT. 0.00001)GOTO 13
0032              NRET=0
0033              RETURN
0034       C
0035       C     ........UPDATE THE DETERMINANT VALUE ......................
           ....
0036           13 IROWK=IROW(K)
0037              JCOLK=JCOL(K)
0038              DETER=DETER*PIVOT
0039       C
0040       C     ........ NORMALIZE PIVOT ROW ELEMENTS ....................
0041              DO 14 J=1,MAX
0042           14 A(IROWK,J)=A(IROWK,J)/PIVOT
0043       C
0044       C     .........CARRY OUT ELIMINATION AND DEVELOP INVERSE .........
0045              A(IROWK,JCOLK)=1./PIVOT
0046              DO 18 I=1,N
0047              AIJCK=A(I,JCOLK)
0048              IF(I .EQ. IROWK)GOTO 18
0049              A(I,JCOLK)=-AIJCK/PIVOT
0050              DO 17 J=1,MAX
0051           17 IF(J .NE. JCOLK)A(I,J)=A(I,J)-AIJCK*A(IROWK,J)
0052           18 CONTINUE
0053       C
0054       C     ........ORDER SOLUTION VALUES (IF ANY) AND CREATE JORD ARRAY
           ........
0055              DO 20 I=1,N
0056              IROWI=IROW(I)
0057              JCOLI=JCOL(I)
0058              JORD(IROWI)=JCOLI
```

```
0059        20 IF(INDIC .GE. 0)X(JCOLI)=A(IROWI,MAX)
0060   C
0061   C       ........ADJUST SIGN OF DETERMINANT ................
0062           INTCH=0
0063           NM1=N-1
0064           DO 22 I=1,NM1
0065           IP1=I+1
0066           DO 22 J=IP1,N
0067           IF(JORD(J) .GE. JORD(I))GOTO 22
0068           JTEMP=JORD(J)
0069           JORD(J)=JORD(I)
0070           JORD(I)=JTEMP
0071           INTCH=INTCH+1
0072        22 CONTINUE
0073           IF(INTCH/2*2 .NE. INTCH) DETER=-DETER
0074   C
0075   C       ........ IF INDIC IS POSITIVE RETURN WITH RESULTS ..........
0076           IF(INDIC .LE. 0)GOTO 26
0077           NRET=1
0078           RETURN
0079   C       ........ FIRST BY ROWS ......
0080        26 DO 28 J=1,N
0081           DO 27 I=1,N
0082           IROWI=IROW(I)
0083           JCOLI=JCOL(I)
0084        27 Y(JCOLI)=A(IROWI,J)
0085           DO 28 I=1,N
0086        28 A(I,J)=Y(I)
0087   C       ........ THEN BY COLUMNS .......
0088           DO 30 I=1,N
0089           DO 29 J=1,N
0090           IROWJ=IROW(J)
0091           JCOLJ=JCOL(J)
0092        29 Y(IROWJ)=A(I,JCOLJ)
0093           DO 30 J=1,N
0094        30 A(I,J)=Y(J)
0095   C
0096   C       .......RETURN FOR INDIC NEGATIVE OR ZERO
0097           NRET=1
0098           RETURN
0099           END
0001   ASMB,L
0002           NAM RDVAL,6    READ VALUE(S) FROM PIR DATA BASE
0003           EXT PIRSZ,DBADR,.ENTR
0004           ENT RDVAL
0005   ****************************************************************
0006   *       . READ A VALUE FROM THE P.I.R. DATA BASE
0007   *       *
0008   *       CALL RDVAL(FIELD, BUFFER)              READ VALUES FOR ALL POINTS(24)
0009   *       CALL RDVAL(FIELD, VALUE, CHANNEL#)     READ ONLY CHANNEL#'S VALUE
0010   *       *
0011   ****************************************************************
0012   FIELD  BSS 1           P.I.R. DESIRED VALUE OR "FIELD"
0013   BUFFR  BSS 1           USER'S BUFFER ADDRESS
0014   POINT  BSS 1           P.I.R. NO. OR CHANNEL NO. DESIRED
0015   *
0016   RDVAL  NOP
0017          JSB .ENTR
0018          DEF FIELD       GET PARAMETER ADDRESSES
0019   *
0020          CLB,INB
0021          LDA FIELD,I     GET DESIRED OFFSET INTO POINT RECORD
0022          ADA =D-2        IF OFFSET IS LESS THAN 2...
```

```
0023            SSA
0024            JMP *+4
0025            ADA =D-59      ... OR GREATER THAN 60, THEN ...
0026            SSA
0027            INB            ... NO. OF WORDS PER VALUE = 1, ELSE = 2.
0028            CMB,INB
0029            STB WDCNT      USE IT AS LOOP COUNTER
0030            STB SAVCT      ... & SAVE IT FOR LATER USE AGAIN
0031    *
0032            LDA BUFFR      SET UP USER-BUFFER POINTER ...
0033            STA BFPTR      ... FOR MOVING WORDS.
0034    *
0035    *       SET LOOP COUNTER FOR GETTING ALL OR ONE VALUE
0036            LDB =D24
0037            LDA POINT      GET ADDRESS IN "POINT"
0038            SZA            IF IT IS ZERO, THEN ALL VALUES ARE REQUESTED
0039            CLB,INB
0040            CMB,INB
0041            STB LPCNT      SAVE AS LOOP COUNTER
0042    *
0043            SZA,RSS        IF NO POINT GIVEN, GO GET IT ALL.
0044            JMP MPY
0045            LDA POINT,I    OTHERWISE, SET ADDRESS OF FIRST VALUE
0046            ADA =D-1       LESS ONE FOR FINDING ADDRESS
0047    MPY     MPY PIRSZ      TIMES THE SIZE OF A POINT RECORD
0048            ADA DBADR
0049            ADA FIELD,I
0050            STA VADDR      SAVE THIS ADDRESS FOR LATER USE
0051            STA VALAD      = ADDRESS OF VALUE
0052    LOOP    LDA VALAD,I    GET THE VALUE FROM THE P.I.R.
0053            STA BFPTR,I    PUT IT IN USER'S BUFFER
0054    *
0055            ISZ BFPTR      INCREMENT BUFFER POINTER
0056            ISZ VALAD      INCREMENT ADDRESS OF VALUE(LOOK AT NEXT WORD)
0057            ISZ WDCNT      BUMP WORD COUNTER
0058            JMP LOOP       IF WORD COUNT NOT ZERO, MOVE ANOTHER WORD
0059    *
0060    *       IF MORE THAN ONE VALUE WAS REQUESTED, LOOP TO GET THEM
0061            LDA VADDR      GET ADDRESS OF LAST VALUE FIELD (OFFSET),
0062            ADA PIRSZ      ADD THE P.I.R. SIZE ...
0063            STA VADDR      ... TO GET ADDRESS OF NEXT POINT'S VALUE FIELD.
0064    *
0065            LDB SAVCT      RETRIEVE WORD COUNT AGAIN
0066            STB WDCNT
0067    *
0068            ISZ LPCNT      HAVE WE GOTTEN EVERYTHING REQUESTED?
0069            JMP LOOP-1     IF NOT, KEEP GOING.
0070    *
0071    *
0072    *       RETURN TO CALLER
0073    *
0074            CLA            ELSE, SET ADDRESS IN "POINT" TO ZERO FOR SUBSEQUENT CALLS
0075            STA POINT
0076            JMP RDVAL,I    RETURN
0077    *
0078    *
0079    *       DATA STORAGE
0080    *
0081    BFPTR   BSS 1          POINTER INTO USER'S BUFFER
0082    WDCNT   BSS 1          COUNT OF WORDS PER VALUE TO MOVE ( 1 OR 2 )
0083    SAVCT   BSS 1          COPY OF ABOVE COUNT, BUT DOES NOT CHANGE
0084    LPCNT   BSS 1          LOOP COUNTER FOR ACCESSING ALL P.I.R.S OR JUST ONE
0085    VADDR   BSS 1          ADDRESS OF THE P.I.R. FIELD TO BE MOVED
0086    VALAD   BSS 1          ADDRESS OF THE P.I.R. WORD TO BE MOVED
0087    *
0088            END RDVAL
```

```
0001  FTN4X,L
0002  C*****************************************************************
0003  C**                                                              **
0004  C**            SUBROUTINE DARED(DATA,IB)                         **
0005  C**                                                              **
0006  C**         THICKNESS DATA REDUCTION ROUTINE                     **
0007  C**                                                              **
0008  C**  This subroutine accepts the raw data from the LFE program   **
0009  C**  for segment thickness and converts it into a buffer con-    **
0010  C**  taining 24 lane thicknesses numbered from die bolt #1 to    **
0011  C**  die bolt #24.  First, the routine examines the data to      **
0012  C**  determine the locations of the two coating edges (where     **
0013  C**  the thickness goes high on either side of the film).        **
0014  C**  Then the number of segments between the two edges is        **
0015  C**  calculated and the appropriate number of segments dis-      **
0016  C**  carded on either side to result in 72 segments in the       **
0017  C**  middle of the film which comprise the middle 18 bolts (4    **
0018  C**  segments per bolt).  Finally the segments at the edges      **
0019  C**  are parcelled out as required to give thickness values      **
0020  C**  for lanes #1-#3 and #21-#24, which are the lanes which      **
0021  C**  experience neckdown.                                        **
0022  C**                                                              **
0023  C                                                              
0024  C**                                                              **
0025  C**                                                              **
0026  C**                                                              **
0027  C**                                                              **
0028  C**                                                              **
0029  C*****************************************************************
0030        SUBROUTINE DARED(DATA)
0031        DIMENSION DATA(150),THICK(24),DAT2(150)
0032        EXTERNAL THCUR,THSET
0033        INTEGER RGTEND
0034  C
0035  C
0036  C*****If average thickness is out of acceptable range, then exit.
0037  C
0038  C
0039        IF(DATA(1) .GT. 8.5 .OR. DATA(1) .LT. 5.0)GOTO 140
0040  C
0041  C
0042  C*****Find the right coating edge, RGTEND
0043  C
0044  C
0045        DO 100 I=3,20
0046        DIF=(DATA(I)-DATA(I-1))/DATA(1)
0047  C
0048  C*****The edge should be positive and have a slope of >30% of base line.
0049  C
0050        IF(DIF .LE. .3)GOTO 100
0051        IF((DATA(I+1)-DATA(I))/DATA(1)            .LE. -.5)GOTO 100
0052  C     IF(DATA(I).GT. -1.)GOTO 101
0053        GOTO 101
0054    100 CONTINUE
0055  C
0056  C*****Couldn't find the edge!  Test segment #2.
0057  C
0058        IF(DATA(2).GT.-1)RGTEND=2
0059        IF(RGTEND .NE. 2)RGTEND=4
0060        GOTO 102
0061  C
0062  C*****The right edge was found to occur on segment #I.
0063  C
0064    101 RGTEND=I
0065    102 CONTINUE
0066  C
0067  C*****Now use the same technique to locate the left coating edge, LFTEND
0068  C
```

```
0069            DO 103 I=2,20
0070            J= 98-I
0071            DIF=(DATA(J)-DATA(J+1))/DATA(1)
0072            IF(DIF .LE..3)GOTO 103
0073            IF((DATA(J-1)-DATA(J))/DATA(1)              .LE. -.5)GOTO 103
0074      C     IF(DATA(J).GT. -1.)GOTO 104
0075            GOTO 104
0076        103 CONTINUE
0077            IF(DATA( 97) .GT.-1)LFTEND=97
0078            IF(LFTEND .NE. 97)LFTEND= 92
0079            GOTO 105
0080      C
0081      C*****The left edge was located at segment #J.
0082        104 LFTEND=J
0083      C
0084        123 FORMAT(' LEFT,RIGHT: ',I4,2X,I4)
0085      C
0086      C*****Now add the scan average to each deviation to get actual thi
ckness(mils)
0087      C
0088        105 DO 120 I=2,105
0089            DAT2(I)=DATA(I)+DATA(1)
0090        120 CONTINUE
0091      C
0092      C*****Calculate the #segments of coating, RANGE.
0093      C
0094            WRITE(6,123)LFTEND,RGTEND
0095            RANGE=LFTEND-RGTEND
0096            IF(RANGE .GT. 72)GOTO 106
0097            L4EDGE=LFTEND
0098            ICUTL=0
0099            GOTO 107
0100      C
0101      C*****Establish the #segments of coating on left edge on bead, ICU
TL
0102      C
0103        106 ICUTL=(RANGE-72)/2
0104      C
0105      C*****Calculate segment # of Lane 4 edge, L4EDGE.
0106      C
0107            L4EDGE=LFTEND-ICUTL
0108      C
0109      C******For Lanes 4 to 21, calculate the average thickness of the 4
0110      C******segments making up that lane and put in buffer, THICK
0111      C
0112        107 DO 108 LANE=4,21
0113            SMLAN=0
0114            LANEST=L4EDGE-(LANE-4)*4
0115            DO 109 I=1,4
0116            LSEG=LANEST+1-I
0117            SMLAN=SMLAN+DAT2(LSEG)
0118        109 CONTINUE
0119            THICK (LANE)=SMLAN/4
0120        108 CONTINUE
0121            ICUTR=RANGE-72-ICUTL
0122            IF(ICUTR .LE. 0)ICUTR=0
0123      C
0124      C*****Now calculate the segments on coating representing the neckd
own
0125      C*****lanes (1-3 on left and 22-24 on right). Use the following a
lgorithm:
0126      C                  Lane 3 or Lane 22 --- 50% of the bead width
0127      C                  Lane 2 or Lane 23 --- 65% of the remainder
0128      C                  Lane 1 or Lane 24 --- Remainder
0129      C
0130      C
0131            LSEG3=INT(.5*ICUTL+.5)
0132            SMLAN=0
0133            DO 110 I=1,LSEG3
0134            SMLAN=SMLAN+DAT2(L4EDGE+I)
0135        110 CONTINUE
```

```
0136            THICK(3)=SMLAN/LSEG3
0137            L3EDGE=L4EDGE+LSEG3
0138            ICUT12=ICUTL-LSEG3
0139            LSEG2=INT(.65*ICUT12+.5)
0140            SMLAN=0
0141            DO 111 I=1,LSEG2
0142            SMLAN=SMLAN+DAT2(L3EDGE+I)
0143        111 CONTINUE
0144            THICK(2)=SMLAN/LSEG2
0145            L2EDGE=L3EDGE+LSEG2
0146            LSEG1=ICUT12-LSEG2
0147            IF(LSEG1 .LE. 0)GOTO 112
0148            SMLAN=0
0149            DO 113 I=1,LSEG1
0150            SMLAN=SMLAN+DAT2(L2EDGE+I)
0151        113 CONTINUE
0152            THICK(1)=SMLAN/LSEG1
0153            GOTO 114
0154        112 THICK(1)=THICK(2)
0155        114 LSEG22=INT(.5*ICUTR+.5)
0156            L22EDG=L4EDGE-73
0157            SMLAN=0
0158            DO 115 I=1,LSEG22
0159            SMLAN=SMLAN+DAT2(L22EDG +1-I)
0160        115 CONTINUE
0161            THICK(22)=SMLAN/LSEG22
0162            ICUT34=ICUTR-LSEG22
0163            LSEG23=INT(.65*ICUT34+.5)
0164            L23EDG=L22EDG-LSEG22
0165            SMLAN=0
0166            DO 116 I=1,LSEG23
0167            SMLAN=SMLAN+DAT2(L23EDG+1-I)
0168        116 CONTINUE
0169            THICK(23)=SMLAN/LSEG23
0170            LSEG24=ICUT34-LSEG23
0171            IF(LSEG24 .LE. 0)GOTO 117
0172            L24EDG=L23EDG-LSEG23
0173            SMLAN=0
0174            DO 118 I=1,LSEG24
0175            SMLAN=SMLAN+DAT2(L24EDG+1-I)
0176        118 CONTINUE
0177            THICK(24)=SMLAN/LSEG24
0178            GO TO 119
0179        117 THICK(24)=THICK(23)
0180        119 CONTINUE
0181      C
0182      C*****Fill the lane thickness buffer, THCUR, with the new calculated values.
0183      C
0184      C*****Now calculate the average thickness for lanes 4 to 21.
0185      C
0186            SUMR=0
0187            DO 308 I=4,21
0188        308 SUMR=SUMR+THICK(I)
0189            AVETH=SUMR/18
0190            CALL WRVAL(THCUR,THICK)
0191            DO 309 I=1,24
0192            CALL WRVAL(THSET,AVETH,I)
0193        309 CONTINUE
0194      C     WRITE(1,208)(THICK(L),L=1,24)
0195      C     WRITE(6,208)(THICK(L),L=1,24)
0196        208 FORMAT(15X,'LANE THICKNESS VALUES (mils)',/,3(2X,8(F6.3,1X),/))
0197        140 RETURN
0198            END
```

```
0001  ASMB,L
0002        NAM WRVAL,6  WRITE VALUE(S)  TO  PIR DATA BASE
0003        EXT PIRSZ,DBADR,.ENTR
0004        ENT WRVAL
0005  ****************************************************************
0006  *     WRITE A VALUE INTO THE P.I.R. DATA BASE FROM USER'S BUFFER
       *
0007  *
       *
0008  *     CALL WRVAL(FIELD, BUFFER)              WRITE VALUES FOR ALL PO
INTS(24) *
0009  *     CALL WRVAL(FIELD, VALUE, CHANNEL#)     WRITE ONLY CHANNEL#'S V
ALUE  *
0010  *
       *
0011  ****************************************************************
0012  *
0013  FIELD BSS 1           P.I.R. DESIRED VALUE OR "FIELD"
0014  BUFFR BSS 1           USER'S BUFFER ADDRESS
0015  POINT BSS 1           P.I.R. NO. OR CHANNEL NO. DESIRED
0016  *
0017  WRVAL NOP
0018        JSB .ENTR
0019        DEF FIELD       GET PARAMETER ADDRESSES
0020  *
0021        CLB,INB
0022        LDA FIELD,I     GET DESIRED OFFSET INTO POINT RECORD
0023        ADA =D-2        IF OFFSET IS LESS THAN 2...
0024        SSA
0025        JMP *+4
0026        ADA =D-59       ... OR GREATER THAN 60, THEN ...
0027        SSA
0028        INB             ... NO. OF WORDS PER VALUE =1, ELSE=2.
0029        CMB,INB
0030        STB WDCNT       USE IT AS LOOP COUNTER
0031        STB SAVCT       ... & SAVE IT FOR LATER USE HERE
0032  *
0033        LDA BUFFR       SET UP USER-BUFFER POINTER ...
0034        STA BFPTR       ... FOR MOVING WORDS.
0035  *
0036  *     SET LOOP COUNTER FOR WRITING ALL OR ONE VALUE
0037        LDB =D24
0038        LDA POINT       GET ADDRESS IN "POINT"
0039        SZA             IF IT IS ZERO, ALL VALUES ARE REQUESTED
0040        CLB,INB
0041        CMB,INB
0042        STB LPCNT
0043  *
0044        SZA,RSS         IF NO POINT WAS GIVEN, GO GET IT ALL.
0045        JMP MPY
0046        LDA POINT,I     OTHERWISE, SET ADDRESS OF FIRST VALUE
0047        ADA =D-1          LESS ONE FOR GETTING ADDRESS
0048  MPY   MPY PIRSZ       TIME SIZE OF A POINT RECORD
0049        ADA DBADR
0050        ADA FIELD,I     ADD THE DESIRED OFFSET
0051        STA VADDR       SAVE THIS ADDRESS FOR LATER USE
0052        STA VALAD       = ADDRESS OF VALUE
0053  LOOP  LDA BFPTR,I     GET THE VALUE FROM THE USER'S BUFFER
0054        STA VALAD,I     PUT IT IN THE P.I.R.
0055  *
0056        ISZ BFPTR       INCREMENT BUFFER POINTER
0057        ISZ VALAD       INCREMENT ADDRESS OF VALUE(LOOK AT NEXT WORD)
0058        ISZ WDCNT       BUMP WORD COUNTER
0059        JMP LOOP        IF WORD COUNT NOT ZERO, MOVE ANOTHER WORD
0060  *
0061  *     IF MORE THAN ONE VALUE WAS REQUESTED, LOOP TO GET THEM
0062        LDA VADDR       GET ADDRESS OF LAST VALUE FIELD (OFFSET),
```

```
0063            ADA PIRSZ       ADD THE P.I.R. SIZE ...
0064            STA VADDR         ... TO GET ADDRESS OF NEXT POINT'S VALUE FIELD.
0065     *
0066            LDB SAVCT       RETRIEVE WORD COUNT
0067            STB WDCNT
0068     *
0069            ISZ LPCNT       HAVE WE GOTTEN EVERYTHING REQUESTED?
0070            JMP LOOP-1      IF NOT, KEEP GOING.
0071            CLA             ELSE, SET ADDRESS IN "POINT" TO ZERO FOR SUBSEQUENT CALLS
0072            STA POINT
0073            JMP WRVAL,I     RETURN
0074     *
0075     *
0076     *   DATA STORAGE
0077     *
0078     BFPTR BSS 1            POINTER INTO USER'S BUFFER
0079     WDCNT BSS 1            COUNT OF WORDS PER VALUE TO MOVE ( 1 OR 2 )
0080     SAVCT BSS 1            COPY OF ABOVE COUNT, DOES NOT CHANGE
0081     LPCNT BSS 1            LOOP COUNTER FOR ACCESSING ALL P.I.R.S OR JUST ONE
0082     VADDR BSS 1            ADDRESS OF THE P.I.R. FIELD TO BE MOVED
0083     VALAD BSS 1            ADDRESS OF THE P.I.R. WORD TO BE MOVED
0084     *
0085            END WRVAL
&TSET T=00004 IS ON CR00031 USING 00004 BLKS R=0000
0001     FTN4,L
0002            EXTERNAL TPSET,TPACH,TPACL,THPRO,THDED,THWND,THSET
0003            WRITE(1,301)
0004        301 FORMAT('  DO YOU WISH TO CHANGE TEMP LOOP SETUP (1=YES)?')
0005            READ(1,102)ITLP
0006            IF(ITLP .NE. 1)GOTO 15
0007            WRITE(1,201)
0008        201 FORMAT('  CHANGE SETPOINT FOR ALL LOOPS? (1=YES)')
0009            READ(1,102)KSP
0010            IF(KSP .NE. 1)GOTO 202
0011            WRITE(1,203)
0012        203 FORMAT('  SETPOINT?')
0013            READ(1,9)TSP
0014            DO 204 I=1,24
0015            CALL WRVAL(TPSET,TSP,I)
0016        204 CONTINUE
0017        202 CONTINUE
0018            WRITE(1,101)
0019        101 FORMAT('  CHANGE LAMBDA FOR ALL LOOPS? (1=YES)')
0020            READ(1,102)KLAM
0021        102 FORMAT(I1)
0022            IF(KLAM .NE. 1)GOTO 103
0023            WRITE(1,105)
0024        105 FORMAT('  LAMBDA?')
0025            READ(1,9)TLAM
0026            DO 104 I=1,24
0027            CALL WRVAL(TPACH,TLAM,I)
0028        104 CONTINUE
0029        103 WRITE(1,106)
0030        106 FORMAT('  CHANGE DERIVATIVE TIME FOR ALL LOOPS? (1=YES)')
0031            READ(1,102)KDER
0032            IF(KDER .NE. 1)GOTO 107
0033            WRITE(1,108)
0034        108 FORMAT('  DERIVATIVE TIME?')
0035            READ(1,9)TTDER
0036            DO 109 I=1,24
0037            CALL WRVAL(TPACL,TTDER,I)
0038        109 CONTINUE
0039        107 IF(KLAM .EQ. 1 .AND. KDER .EQ. 1 .AND. KSP .EQ. 1)GOTO 302
0040            WRITE(1,1)
0041          1 FORMAT('  INDIVIDUAL LOOP (1) OR ALL LOOPS (2)?')
0042            READ(1,2)KIN
0043          2 FORMAT(I1)
```

```
0044        IF(KIN .EQ. 2)GOTO 3
0045        WRITE(1,4)
0046      4 FORMAT(' LOOP NO. (1 TO 24)?')
0047        READ(1,5)J
0048      5 FORMAT(I2)
0049        GOTO 7
0050      3 DO 6 J=1,24
0051        IF(KSP .EQ. 1)GOTO 151
0052      7 CALL RDVAL(TPSET,TSET,J)
0053        WRITE(1,8)J,TSET
0054      8 FORMAT(' BOLT NO.',I3,' CURRENT SP: ',F10.0,' NEW SP?')
0055        READ(1,9)TSET
0056        CALL WRVAL(TPSET,TSET,J)
0057    151 IF(KLAM .EQ. 1)GOTO 110
0058        CALL RDVAL(TPACH,TLAM,J)
0059        WRITE(1,10) J,TLAM
0060      9 FORMAT(F10.0)
0061     10 FORMAT(' BOLT NO.',I3,' CURRENT LAMBDA:',F10.0,' NEW LAMBDA?')
0062        READ(1,9)TLAM
0063        CALL WRVAL(TPACH,TLAM,J)
0064    110 IF(KDER .EQ. 1)GOTO 111
0065        CALL RDVAL(TPACL,TTDER,J)
0066        WRITE(1,11)J,TTDER
0067     11 FORMAT(' BOLT NO.',I3,' CURRENT TD:',F10.0,' NEW TD?')
0068        READ(1,9)TTDER
0069        CALL WRVAL(TPACL,TTDER,J)
0070    111 CONTINUE
0071        IF(KIN .EQ. 1)GOTO 15
0072      6 CONTINUE
0073    302 CONTINUE
0074     15 WRITE(1,401)
0075    401 FORMAT('     THICKNESS LOOP SETUP')
0076        WRITE(1,402)
0077    402 FORMAT(' DO YOU WISH TO CHANGE THICKNESS LOOP SETUP(1=YES)')
0078        READ(1,403)ANS
0079    403 FORMAT(F10.0)
0080        IF(ANS .NE. 1)GOTO 156
0081        WRITE(1,404)
0082    404 FORMAT(' THICKNESS SETPOINT (mils):')
0083        READ(1,405)THS
0084        DO 505 I=1,24
0085        CALL WRVAL(THSET,THS,I)
0086    505 CONTINUE
0087        WRITE(1,406)
0088    406 FORMAT(' THICKNESS PROPORTIONAL BAND (%):')
0089        READ(1,405)THP
0090    405 FORMAT(F10.0)
0091        DO 506 I=4,21
0092        CALL WRVAL(THPRO,THP,I)
0093    506 CONTINUE
0094        WRITE(1,407)
0095    407 FORMAT(' THICKNESS LOOP RESET TIME (minutes):')
0096        READ(1,405)THD
0097        DO 507 I=1,24
0098        CALL WRVAL(THDED,THD,I)
0099    507 CONTINUE
0100        WRITE(1,408)
0101    408 FORMAT(' THICKNESS LOOP DERIVATIVE TIME (minutes):')
0102        READ(1,405)THW
0103        DO 508 I=1,24
0104        CALL WRVAL(THWND,THW,I)
0105    508 CONTINUE
0106        THI=THP*3
0107        DO 545 I=1,3
0108        K=25-I
0109        CALL WRVAL(THPRO,THI,I)
0110        CALL WRVAL(THRPO,THI,K)
0111    545 CONTINUE
0112    156 CALL EXIT
0113        END
```

```
0001  FTN4,L
0002      PROGRAM PARDM
0003      DIMENSION TPT(24)
0004      REAL KPT(24)
0005      EXTERNAL TPPRO,TPWND
0006      CALL RDVAL(TPPRO,KPT)
0007      CALL RDVAL(TPWND,TPT)
0008      DO 3 I=1,2
0009      M=0
0010      IF(I .EQ. 2)M=12
0011      WRITE(6,1)(KPT(J),J=M+1,M+12)
0012      WRITE(6,2)(TPT(J),J=M+1,M+12)
0013   3  CONTINUE
0014   1  FORMAT(' GAIN     :',12(F6.3,3X))
0015   2  FORMAT(' TIME CONS:',12(F6.1,3X))
0016      CALL EXIT
0017      END
```

What is claimed is:

1. An extrusion coating apparatus comprising:
a first and a second die member, one of which has a flexible lip thereon, the dies, when mounted in spaced-apart confronting relationship, cooperate to define an elongated extrusion slot having a slot thickness dimension;
a heat responsive expansion element mounted in the one of the dies in an operative relationship with the flexible lip thereon, the element being responsive to the flow of an electric current to expand to an extent corresponding to the magnitude of the current to commensurately modify the thickness dimension of the slot;
an adaptive temperature control network for maintaining the temperature of the heat responsive element within a predetermined range of a predetermined temperature set point corresponding to a predetermined slot thickness dimension by controlling the magnitude of the current permitted to flow through the heat responsive element;
a gauge for monitoring the thickness of an extrudate emanating from the extrusion slot and for generating a signal representative thereof; and,
means responsive to the signal representative of the thickness of the extrudate for generating a required change in the temperature set point to produce an updated temperature set point.

2. The coating apparatus of claim 1 wherein the temperature control network has a temperature sensing device mounted in proximity to the heat responsive element for monitoring the temperature thereof.

3. The coating apparatus of claim 1 wherein the means for generating a temperature set point in response to the thickness of the extrudate comprises a general purpose digital computer operating in accordance with a program.

4. The coating apparatus of claim 2 wherein the means for generating a temperature set point in response to the thickness of the extrudate comprises a general purpose digital computer operating in accordance with a program.

5. The coating apparatus of claim 1 wherein the temperature control network includes a programmable controller operative to control the duty cycle of a relay network whereby the flow of current to the heat responsive element is controlled.

6. The coating apparatus of claim 2 wherein the temperature control network includes a programmable controller operative to control the duty cycle of a relay network whereby the flow of current to the heat responsive element is controlled.

7. The coating apparatus of claim 3 wherein the temperature control network includes a programmable controller operative to control the duty cycle of a relay network whereby the flow of current to the heat responsive element is controlled.

8. Apparatus for controlling the thickness of a film from an extrusion die comprising:
a die body having opposing surfaces forming an opening therebetween, one of said surfaces being adjustable with respect to the other to control the width of said opening;
a plurality of thermal die adjusting bolts disposed along said one surface, said bolts having associated therewith electrical heating means for causing said bolts to expand and reduce the width of said opening upon application of increasing electrical power and to contract and widen said opening upon a reduction of said electrical power;
a thickness measurement and scanning means for measuring thickness of film passing through said opening and at different transverse locations along said film, said measurement means providing a signal proportional to the thickness of said film;
temperature sensing means positioned adjacent each said bolt for sensing the temperature of said bolts and providing a signal proportional to said bolt temperature;
means for converting said thickness measurement signal into a required change in a temperature reference signal to produce an updated temperature reference signal; and
means in the form of an adaptive temperature control arrangement for comparing said updated temperature reference signal with said bolt temperature signal and providing a difference signal and for actuating said electrical heating means in accordance with said difference signal to control the temperature of said bolt and cause said bolt temperature signal to reach said reference signal whereby the thickness of said film is maintained at a predetermined uniform dimension.

9. The apparatus of claim 8 wherein said temperature sensing means is a thermocouple positioned in a temperature sensing relationship with each said bolt.

10. The apparatus of claim 9 including a computer, said means for converting a thickness measurement into an updated temperature difference signal and said means for comparing said signals being included in said computer.

11. The apparatus of claim 8 wherein said actuating means includes means to control the power output to said heating means associated with each bolt to control the temperature of said bolt.

12. The apparatus of claim 11 wherein said means to control the power output includes means to control the percentage of time power is supplied to said heating means in each of said bolts during predetermined time intervals.

13. A method for controlling the thickness of film from an extrusion die having opposing surfaces forming an opening therebetween, one surface being adjustable to control the width of the opening, and a plurality of thermal die adjusting bolts including electrical heating means for adjusting the size of said bolts and said opening comprising the steps of:
 measuring the thickness of film passing through the die opening and providing a signal proportional to the thickness;
 measuring the temperature of said bolts and providing a signal proportional to the bolt temperature;
 converting the thickness measurement signal into a required change in a temperature reference signal to produce an updated temperature reference signal; and using an adaptive temperature control arrangement, comparing the updated temperature reference signal with the bolt temperature signal and providing a difference signal and controlling the heating of said bolts in accordance with said difference signal to cause said bolt temperature signal to reach said reference signal and maintain the thickness of the film at a predetermined uniform dimension.

14. The method of claim 13 wherein the heating of the bolts is controlled by controlling the power output to the heating means associated with each of the bolts to control the temperature of said bolt.

15. The method of claim 13 wherein the heating of the bolts is controlled by controlling the percentage of time power is supplied to said heating means in each of said bolts during predetermined time intervals.

16. Apparatus for controlling the thickness of plastic film from an extrusion die comprising:
 a die body having opposing jaw surfaces forming an opening therebetween, one of said jaw surfaces being adjustable with respect to the other to control the width of said opening;
 a plurality of thermal die adjusting bolts disposed along said one jaw surface, said bolts being mounted in heat-conductive blocks including electrical heating means for causing said bolts to expand and reduce the width of said opening upon application of increasing electrical power and to contract and widen said opening upon a reduction of said electrical power;
 thickness measurement and scanning means for the thickness of plastic film passing through said opening and at different transverse locations along said film, said meaurement means providing a signal proportional to the thickness of said film;
 temperature sensing means positioned at each said block in which said bolts are mounted for sensing the temperature of said bolts and providing a signal proportional to said bolt temperature;
 means for converting said thickness measurement signal into a required change in a temperature reference signal to produce an updated temperature reference signal;
 means for comparing said updated temperature reference signal with said bolt temperature signal and providing a difference signal; and
 means for actuating said electrical heating means in accordance with said difference signal to control the temperature of said bolt and cause said bolt temperature signal to reach said updated temperature reference signal whereby the thickness of said film is maintained at a predetermined uniform dimension.

17. A method for controlling the thickness of plastic film from an extrusion die having opposing jaw surfaces forming an opening therebetween, one jaw surface being adjustable to control the width of the opening, and a plurality of thermal die adjusting bolts being mounted in heat-conductive blocks including electrical heating means for adjusting the size of said bolts and said opening comprising the steps of:
 measuring the thickness of plastic film passing through the die opening and providing a signal proportional to the thickness;
 measuring the temperature of said bolts and providing a signal proportional to the bolt temperature;
 converting the thickness measurement signal into a required change in a temperature reference signal to produce an updated temperature reference signal;
 comparing the updated temperature reference signal with the bolt temperature signal and providing a difference signal; and
 controlling the heating of said bolts in accordance with said difference signal to cause said bolt temperature signal to reach said updated temperature reference signal and maintain the thickness of the plastic film at a predetermined uniform dimension.

* * * * *